United States Patent
Kim

(10) Patent No.: US 10,647,314 B2
(45) Date of Patent: May 12, 2020

(54) APPARATUS AND METHOD FOR INTEGRATED CONTROLLING OF DRIVER ASSISTANCE SYSTEMS

(71) Applicant: MANDO CORPORATION, Gyeonggi-do (KR)

(72) Inventor: Jae Suk Kim, Gyeonggi-do (KR)

(73) Assignee: MANDO CORPORATION, Pyeongtaek-si, Gyeonggi-Do (KR)

(*) Notice: Subject to any disclaimer, the term of this patent is extended or adjusted under 35 U.S.C. 154(b) by 0 days.

(21) Appl. No.: 15/940,743

(22) Filed: Mar. 29, 2018

(65) Prior Publication Data

US 2018/0281781 A1    Oct. 4, 2018

(30) Foreign Application Priority Data

Mar. 31, 2017 (KR) .................. 10-2017-0041365
Mar. 31, 2017 (KR) .................. 10-2017-0041367

(51) Int. Cl.
*B60W 30/06* (2006.01)
*B60W 50/14* (2020.01)
(Continued)

(52) U.S. Cl.
CPC ........ *B60W 30/06* (2013.01); *B60W 50/0098* (2013.01); *B60W 50/06* (2013.01);
(Continued)

(58) Field of Classification Search
CPC . B60W 2050/0094; B60W 2050/0095; B60W 2050/146; B60W 30/06;
(Continued)

(56) References Cited

U.S. PATENT DOCUMENTS

2005/0137766 A1* 6/2005 Miyakoshi ............... B60T 7/22
                                                                701/36
2007/0152870 A1   7/2007 Woodington et al.
2014/0336897 A1* 11/2014 Nordbruch .......... B60W 30/182
                                                                701/93

FOREIGN PATENT DOCUMENTS

JP     2014-215698 A    11/2014
KR   10-2009-0040024 A   4/2009
KR   10-2014-0084962 A   7/2014

* cited by examiner

*Primary Examiner* — Charles J Han
(74) *Attorney, Agent, or Firm* — Morgan, Lewis & Bockius LLP

(57) ABSTRACT

Exemplary embodiments relate to an apparatus and method for integrated control of driver assistance systems (DAS). The apparatus includes a first driver assistance system control module configured to control at least one driver assistance system installed in a vehicle, a second driver assistance system control module configured to control a driver assistance system installed in the vehicle other than the driver assistance system controlled by the first driver assistance system control module, and an integrated control module configured to receive an operating state signal indicating an operating state of the at least one driver assistance system controlled by the first driver assistance system control module from the first driver assistance system control module and transmit an activation control signal for the driver assistance system controlled by the second driver assistance system control module to the second driver assistance system control module when the operating state signal is received.

10 Claims, 16 Drawing Sheets

(51) Int. Cl.
*B60W 50/06* (2006.01)
*B60W 50/00* (2006.01)

(52) U.S. Cl.
CPC ..... *B60W 50/14* (2013.01); *B60W 2050/0094* (2013.01); *B60W 2050/0095* (2013.01); *B60W 2050/146* (2013.01)

(58) Field of Classification Search
CPC ......... B60W 50/14; B60W 2050/0062; B60W 2050/0075; B60W 2050/009; B60W 30/00; B60W 50/00; B60W 50/0098; B60W 50/06; B60W 50/08
See application file for complete search history.

APPARATUS AND METHOD FOR INTEGRATED CONTROLLING OF DRIVER ASSISTANCE SYSTEMS

CROSS REFERENCE TO RELATED APPLICATION

This application claims priority from Korean Patent Application Nos. 10-2017-0041367 & 10-2017-0041365, filed on Mar. 31, 2017, which are hereby incorporated by reference for all purposes as if fully set forth herein.

BACKGROUND OF THE INVENTION

1. Field of the Invention

The present invention relates to a driver assistance system and an apparatus and method for controlling the driver assistance system.

2. Description of the Prior Art

As the demand for safety and convenience of vehicles as well as for performance of vehicles increases, a driver assistance system (DAS) that assists in controlling vehicles on the basis of information acquired through sensors or the like installed in vehicles has been researched, developed, and applied to the vehicles.

Thus, vehicles tend to be equipped with many systems which may be categorized as DAS in addition to default chassis systems.

As an example, vehicles tend to be equipped with driver assistance systems (DAS) such as a smart cruise control (SCC) system for assisting in driving a vehicle, a traffic jam assistance (TJA) system, an autonomous emergency braking (AEB) system for preventing a vehicle collision, a cross traffic assistance (CTA) system, an active blind spot detection (ABSD) system, or a smart parking assistance system (SPAS) for assisting in parking a vehicle.

The driver assistance systems control vehicles and assist drivers on the basis of information acquired through sensors or the like installed in the vehicles according to respective operating conditions.

Since several driver assistance systems are installed in a vehicle, there is a possibility that a driver may be confused or a problem may occur due to simultaneous operation of multiple driver assistance systems.

For example, when an Idle Stop and Go (ISG) system, which automatically turns off an engine of a vehicle in order to enhance the fuel economy of the vehicle when the vehicle is stopped, operates simultaneously with another driver assistance system, this operation may disrupt the operation of the other driver assistance system.

SUMMARY OF THE INVENTION

Exemplary embodiments provide an apparatus and method for integrated control of driver assistance systems (DAS), the apparatus and method being capable of preventing a dangerous situation which may be caused by simultaneous operation of several driver assistance systems (DAS) installed in a vehicle by controlling the operation of the driver assistance systems (DAS).

Exemplary embodiments provide an apparatus and method for integrated control of driver assistance systems (DAS), the apparatus and method being capable of preventing malfunction of a smart parking assistance system (SPAS) due to brake control of a driver assistance system (DAS) while automatic parking of a vehicle is controlled by the SPAS.

Exemplary embodiments provide an apparatus and method for integrated control of driver assistance systems (DAS), the apparatus and method being capable of preventing automatic parking control from being interrupted by simultaneous operation of an Idle Stop and Go (ISG) system or a smart cruise control (SCC) system while the automatic parking control is being performed by the smart parking assistance system (SPAS).

According to an aspect of the present invention, there is provided an apparatus for integrated control of driver assistance systems, the apparatus including a first driver assistance system control module configured to control at least one driver assistance system installed in a vehicle; a second driver assistance system configured to control a driver assistance system installed in the vehicle other than the driver assistance system controlled by the first driver assistance system control module; and an integrated control module configured to receive an operating state signal indicating an operating state of the at least one driver assistance system controlled by the first driver assistance system control module from the first driver assistance system control module and transmit an activation control signal for the driver assistance system controlled by the second driver assistance system control module to the second driver assistance control module when the operating state signal is received.

According to another aspect of the present invention, there is provided method for integrated control of driver assistance systems, the method including receiving an operating state signal from a first driver assistance system control module for controlling at least one driver assistance system installed in a vehicle; determining whether information instructing an operation start for the at least one driver assistance system is included in the operating state signal; and transmitting, to a second driver assistance system control module configured to control a driver assistance system installed in the vehicle other than the at least one driver assistance system controlled by the first driver assistance system control module, an activation control signal instructing deactivation of the other driver assistance system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
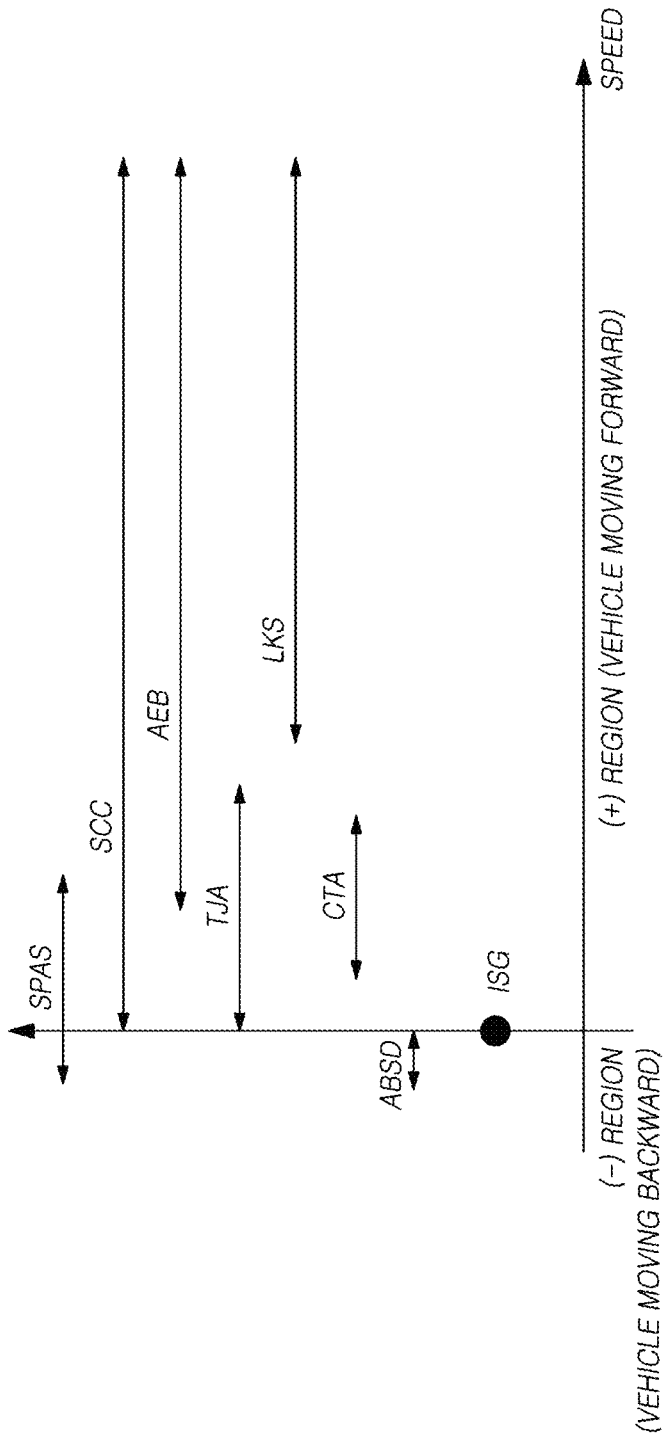
FIG. 1 is a diagram showing an example of speed regions in which a driver assistance system operates according to exemplary embodiments.

Hereinafter, embodiments of the present disclosure will be described in detail with reference to the accompanying drawings. In adding reference numerals for elements in each figure, it should be noted that like reference numerals already used to denote like elements in other figures are used for elements wherever possible. Moreover, detailed description related to well-known functions or configurations will be omitted in order to not unnecessarily obscure subject matters of the present disclosure.

In addition, terms such as first, second, A, B, (a), (b) or the like may be used herein when describing elements of the present disclosure. These terms are merely used to distinguish one structural element from other structural elements, and a property, an order, a sequence and the like of a corresponding structural element are not limited by the term. It should be noted that if it is described in the specification that one element is "connected," "combined" or "coupled" to another element, a third element may be "connected," "combined," and "coupled" between the first and second elements, although the first element may be directly connected, coupled or joined to the second element.

FIG. 1 shows an example of speed regions in which a driver assistance system operates according to exemplary embodiments.

Referring to FIG. 1, a vehicle equipped with the integrated control apparatus for driver assistance systems according to exemplary embodiments may be equipped with several driver assistance systems.

As an example, the vehicle may be equipped with a smart parking assistance system (SPAS) configured to control steering and braking of the vehicle and assist a driver in parking.

The smart parking assistance system (SPAS) searches for a location designated for parking, controls steering and braking of the vehicle, and moves the vehicle to a predetermined location designated for parking on the basis of information acquired through an ultrasonic sensor, a radar sensor, a camera sensor, or the like installed in the vehicle.

Since the smart parking assistance system (SPAS) assists in parking the vehicle, the smart parking assistance system (SPAS) operates in a slower speed region than other driver assistance systems (DAS). Also, the smart parking assistance system (SPAS) operates even in a (−) speed region because the vehicle may move backward for parking.

As another example, the vehicle may be equipped with a Smart Cruise Control (SCC) for controlling acceleration/deceleration of the vehicle and controlling autonomous vehicle driving.

The Smart Cruise Control (SCC) detects an object ahead by means of a radar sensor or the like installed in the vehicle and adjusts a vehicle-to-vehicle distance, a vehicle speed, and the like so that the vehicle may travel at a constant distance from a preceding vehicle.

The Smart Cruise Control (SCC) mainly operates on a road and may operate in almost all (+) speed regions.

As another example, the vehicle may be equipped with an Autonomous Emergency Braking (AEB) system for controlling braking of the vehicle and preventing a collision of the vehicle.

The Autonomous Emergency Braking (AEB) system may reduce an impact of or avoid a collision of a vehicle by detecting an object ahead by means of a radar sensor, a camera sensor, and the like, determining a collision situation, and automatically controlling a brake of the vehicle when the collision is expected to occur.

The Autonomous Emergency Braking (AEB) system operates in a (+) speed region of a certain speed or higher because unnecessary braking may occur when the Autonomous Emergency Braking (AEB) system operates in a low speed region.

As still another example, the vehicle may be equipped with an Idle Stop and Go (ISG) system for turning on/off an engine of the vehicle depending on whether the vehicle is stopped in order to enhance the fuel economy of the vehicle.

The Idle Stop and Go (ISG) system may efficiently control the engine of the vehicle by sensing the vehicle's speed, turning off the engine of the vehicle when the vehicle is kept stopped for a certain period of time or longer, and turning on the engine when the vehicle is expected to move due to a driver's accelerator operation or the like.

The Idle Stop and Go (ISG) system may operate when the vehicle has a speed of zero because the engine of the vehicle is turned off while the vehicle is stopped.

In addition to the above-described driver assistance systems (DAS), the vehicle may be equipped with various other driver assistance systems DAS such as a traffic jam assistance (TJA) system, a lane keeping system (LKS), a cross traffic assistance (CTA) system, an active blind spot detection (ABSD) system, or the like.

In this case, several driver assistance systems (DAS) may have speed regions overlapping one another. Thus, when a plurality of driver assistance systems (DAS) operate in overlapping speed regions, the driver may be in danger.

As an example, while a smart parking assistance system (SPAS) is operating, a vehicle being automatically parked may follow another vehicle which is ahead due to operation of a Smart Cruise Control (SCC) or may suddenly stop due to operation of an Autonomous Emergency Braking (AEB) system.

Alternatively, while a smart parking assistance system (SPAS) is operating, the engine of a vehicle being automatically parked may be turned off due to operation of the Idle Stop and Go (ISG) system.

Also, while a Smart Cruise Control (SCC) is operating, operation of a smart parking assistance system (SPAS) may attempt to park a vehicle between traveling nearby vehicles, and this may cause a dangerous situation. When an Idle Stop and Go (ISG) system operates so that the engine is turned off, a smart parking assistance system (SPAS) or the like cannot operate.

The embodiments provide an integrated control apparatus for driver assistance systems capable of preventing a dangerous situation caused by simultaneous operation of several driver assistance systems (DAS) by controlling the operation of the driver assistance systems (DAS) in a vehicle equipped with the driver assistance systems (DAS).

Figure 2:
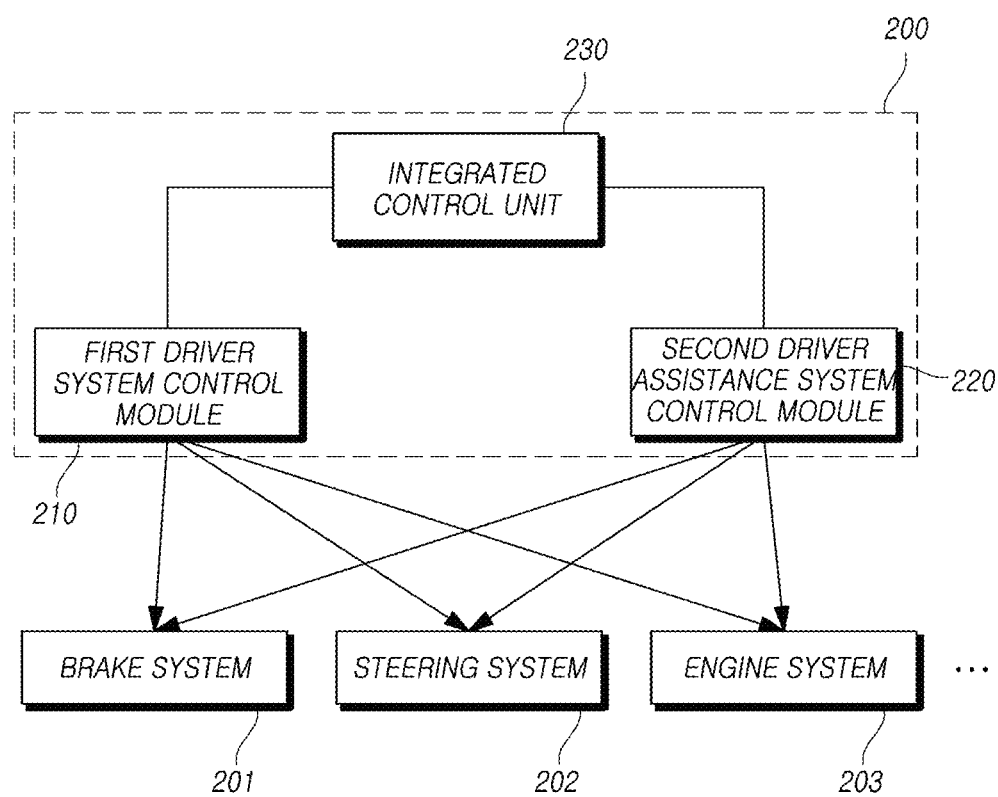
FIG. 2 is a diagram showing a configuration of an integrated control apparatus for driver assistance systems according to an embodiment.

FIG. 2 is a diagram showing a configuration of an integrated control apparatus for driver assistance systems according to an embodiment.

Referring to FIG. 2, the integrated control apparatus 200 for driver assistance systems may include a first driver assistance system control module 210 configured to control at least one of the driver assistance systems installed in the vehicle and a second driver assistance system control module 220 configured to control driver assistance systems installed in the vehicle other than the driver assistance systems controlled by the first driver assistance system control module 210.

For example, each of the first driver assistance system control module 210 and the second driver assistance system control module 220 may control operation of one or more driver assistance systems installed in the vehicle. As shown in FIG. 1, various types of driver assistance systems may be installed in the vehicle, and various combinations of the driver assistance systems may be applied to the vehicle when the vehicle is manufactured or updated. For example, an automatic parking assistance system and an Idle Stop and Go (ISG) system may be provided according to option selection for the vehicle. Alternatively, all of the driver assistance systems shown in FIG. 1 may be provided according to option selection for the vehicle.

The following description assumes that two driver assistance system control modules are applied to the vehicle. However, a plurality of driver assistance system control modules may be applied to the vehicle to separately control the driver assistance systems according to a setting criterion.

Also, the integrated control apparatus 200 for the driver assistance systems may include an integrated control module 230 configured to transmit an activation control signal for the driver assistance systems controlled by the second driver assistance system control modules 220 to the second driver assistance system control module 220 when an operating state signal indicating an operating state of at least one of the driver assistance systems controlled by the first driver assistance system control module 210 is received from the first driver assistance system control module 210.

The integrated control module 230 may determine a control module for each of the driver assistance systems installed in the vehicle as any one of the first driver assistance system control module and the second driver assistance system control module on the basis of a predetermined criterion. That is, the integrated control module 230 may determine which module will control individual driver assistance systems installed in the vehicle according to a predetermined criterion.

For example, the predetermined criterion may be set on the basis of at least one of information regarding priorities that are set for the driver assistance systems, information regarding configurations of control targets of the vehicle that are controlled by the driver assistance systems, and information regarding conditions that are applied for the driver assistance systems.

As an example, when a plurality of driver assistance systems are installed in the vehicle, the integrated control module 230 may configure the first driver assistance system control module 210 to control a driver assistance system with relatively high priority and configure the second driver assistance system control module 220 to control a driver assistance system with relatively low priority on the basis of predetermined priority for each driver assistance system. It will be appreciated that they may be configured in the reverse manner.

As another example, the integrated control module 230 may select and configure the control modules according to information regarding configurations of control targets of the vehicle that are controlled by the driver assistance systems. For example, the AEB, CTA, SCC, and the like may control a brake system 201 of the vehicle, the ISG and the like may control an engine system 203 of the vehicle, and the SPAS, ABSD, LKS, and the like may control a steering system 202 of the vehicle. As described above, when the driver assistance systems control respective systems installed in the vehicle, the control modules may be classified on the basis of the control target configuration information.

As still another example, as shown in FIG. 1, the integrated control module 230 may classify and determine the control modules on the basis of application condition information such as vehicle speed, scenario, vehicle traveling direction, and road condition in which the driver assistance systems are applied.

As described above, the integrated control apparatus 200 for the driver assistance systems may classify and configure the driver assistance systems for the individual control modules 220 as necessary according to various criteria.

Also, the integrated control module 230 may prevent a problem about simultaneous operation of the driver assistance systems that may occur in a specific situation by controlling operation of the classified and configured control modules 210 and 220 in an integrated manner.

For a better understanding, the following description assumes that a smart parking assistance system (SPAS) is included in the first driver assistance system control module 210, but, as described above, the present is not limited thereto.

As an example, the first driver assistance system control module 210 may be configured to control a smart parking assistance system for controlling vehicle parking, and the second driver assistance system control module 220 may be configured to control one or more driver assistance systems for controlling the brake system 201 installed in the vehicle other than the smart parking assistance system.

In this case, when a parking assistance request signal of the smart parking assistance system is included in the operating state signal, the integrated control module 230 may transmit an activation control signal instructing the second driver assistance system control module 220 to deactivate the other driver assistance systems. That is, when a request is received from the first driver assistance system control module 210, the integrated control module 230 may transmit a deactivation command to the second driver assistance system control module 220 in order to prevent a collision that may be caused by simultaneous activation of driver assistance systems by the modules 210 and 220.

In addition, when the above-described activation control signal is transmitted, the integrated control module 230 may transmit a parking assistance start command to the first driver assistance system control module 210.

Thus, the integrated control module 230 may prevent an occurrence of a problem which may be caused by a collision between, for example, the SPAS and the SCC in which the vehicle follows a preceding vehicle while the vehicle is controlled to be parked.

Also, when a parking assistance completion signal of the smart parking assistance system is included in the operating state signal, the integrated control module 230 may transmit an activation control signal instructing the second driver assistance system control module 220 to activate the other driver assistance systems. Thus, the second driver assistance system control module 220 may also control related driver assistance systems in a safe state to apply the control to the vehicle.

As another example, the first driver assistance system control module 210 may be configured to control a smart parking assistance system for controlling vehicle parking, and the second driver assistance system control module 220 may be configured to control one or more driver assistance systems for controlling the engine system 203 installed in the vehicle other than the smart parking assistance system.

In this case, when a parking assistance request signal of the smart parking assistance system is included in the operating state signal, the integrated control module 230 may transmit an activation control signal instructing the second driver assistance system control module 220 to deactivate the other driver assistance systems. That is, when a request is received from the first driver assistance system control module 210, the integrated control module 230 may transmit a deactivation command to the second driver assistance system control module 220 in order to prevent a collision that may be caused by simultaneous activation of driver assistance systems by the modules 210 and 220.

In addition, when the above-described activation control signal is transmitted, the integrated control module 230 may transmit a parking assistance start command to the first driver assistance system control module 210. Thus, the integrated control module 230 may prevent the engine from being turned off by the ISG due to a collision between the SPAS and the ISG during SPAS operation.

Also, when a parking assistance completion signal of the smart parking assistance system is included in the operating state signal, the integrated control module 230 may transmit an activation control signal instructing the second driver assistance system control module 220 to activate the other driver assistance systems. Thus, the second driver assistance system control module 220 may also control related driver assistance systems in a safe state to apply the control to the vehicle.

Also, when a parking assistance start signal of the smart parking assistance system is included in the operating state signal, the integrated control module 230 may ignore operating state signals for the other driver assistance systems received from the second driver assistance system control module 220.

The above description is related to a case in which the control module 210 has higher operating priority or scenario priority than the control module 220. Various operations may be set depending on the driver assistance systems included in the control modules.

Operation of the above-described integrated control apparatus for driver assistance systems will be described with reference to FIG. 3.

Figure 3:
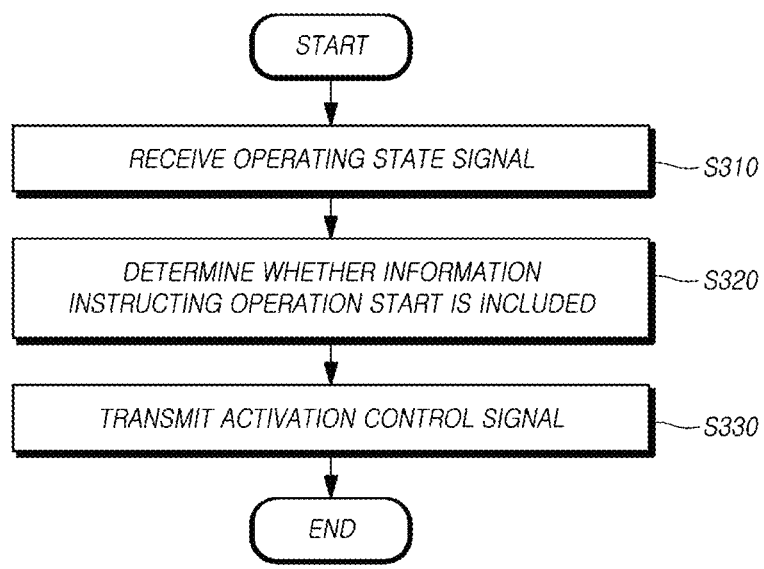
FIG. 3 is a diagram showing an integrated control method for driver assistance systems according to an embodiment.

FIG. 3 is a diagram showing an integrated control method for driver assistance systems according to an embodiment.

Referring to FIG. 3, the integrated control method for driver assistance systems may include receiving an operating state signal from a first driver assistance system control module for controlling at least one driver assistance system installed in a vehicle (S310).

For example, the receiving of the operating state signal may include receiving at least one of an operation request signal, an operation start signal, and an operation completion signal for the driver assistance system controlled by the first driver assistance system control module from the first driver assistance system control module. An operation request signal is a signal requesting operation start for a corresponding driver assistance system, and an operation start signal is a signal indicating that the operation of the corresponding driver assistance system is started. Also, the operation completion signal is a signal indicating that the operation of the corresponding driver assistance system is completed.

The integrated control method for driver assistance systems may include determining whether information for instructing an operation start of a driver assistance system is included in the operating state signal (S320). As described above, the operating state signal may include various information. Thus, in operation S320, it is possible to determine whether start instruction information for instructing an operation start is included in the operating state signal.

The integrated control method for driver assistance systems may include transmitting, to the second driver assistance system control module for controlling driver assistance systems installed in the vehicle other than a driver assistance system controlled by the first driver assistance system control module, an activation control signal for instructing deactivation of the other driver assistance systems when it is determined that the start instruction information is included (S330).

For example, when the information instructing operation start is included in the operating state signal, an activation control signal is transmitted to the second driver assistance system control module in step S330. The activation control signal may include information indicating deactivation of the driver assistance systems included in the second driver assistance system control module.

In addition, the integrated control method for driver assistance systems may include transmitting deactivation instruction information for the operation request signal described with reference to FIG. 2 and transmitting an operation start command. Alternatively, the integrated control method for driver assistance systems may include ignoring operation request signals transmitted from other control modules or transmitting an activation control signal in order to forcibly deactivate an operation start signal when the operation start signal is received.

Also, the driver assistance systems included in the control modules may be variously set as described below.

As an example, the first driver assistance system control module may be configured to control a smart parking assistance system for controlling vehicle parking, and the second driver assistance system control module may be configured to control one or more driver assistance systems for controlling any brake control modules installed in the vehicle other than the smart parking assistance system.

As another example, the first driver assistance system control module may be configured to control a smart parking assistance system for controlling vehicle parking, and the second driver assistance system control module may be configured to control one or more driver assistance systems for controlling the engine control module installed in the vehicle other than the smart parking assistance system.

As described above, by configuring a plurality of driver assistance system control modules to control different driver assistance systems and allowing the integrated control module to manage operation of the driver assistance system control modules in an integrated manner, it is possible to prevent simultaneous operation of the driver assistance systems and operation errors of the driver assistance systems according to the present disclosure.

The present disclosure described with reference to FIGS. 1 to 3 will be described below by way of more detailed embodiments in order to facilitate understanding.

A case in which the driver assistance system for controlling the brake system of the vehicle is included in the second driver assistance system control module and a case in which the driver assistance system for controlling the engine system of the vehicle is included in the second driver assistance system control module will be described below in detail as representative examples, with respect to a case in which a driver assistance system for parking assistance is included in the first driver assistance system control module.

The case in which the driver assistance system for controlling the brake system of the vehicle is included in the second driver assistance system control module will be described with reference to FIGS. 4 to 9, and the case in which the driver assistance system for controlling the engine system of the vehicle is included in the second driver assistance system control module will be described with reference to FIGS. 10 to 16.

The following exemplary description is provided to help understanding of FIGS. 1 to 3, and the present invention is not limited thereto.

Also, for convenience of understanding, more detailed terms will be used to describe FIGS. 4 to 9, and also more detailed terms will be used to describe FIGS. 10 to 16. The meaning of each term will be described in detail before FIG. 4 or FIG. 10.

First embodiment: an embodiment in which the driver assistance system for controlling the brake system of the vehicle is included in the second driver assistance system control module.

In the first embodiment, for the sake of clarity, the first driver assistance system control module of FIGS. 1 to 3 is referred to as a parking assistance control module, and the second driver assistance system control module is referred to as a driver assistance system control module. Also, if necessary, the integrated control module is referred to as an integrated control unit.

The more detailed embodiments will be described below, focusing on the first embodiment.

Figure 4:
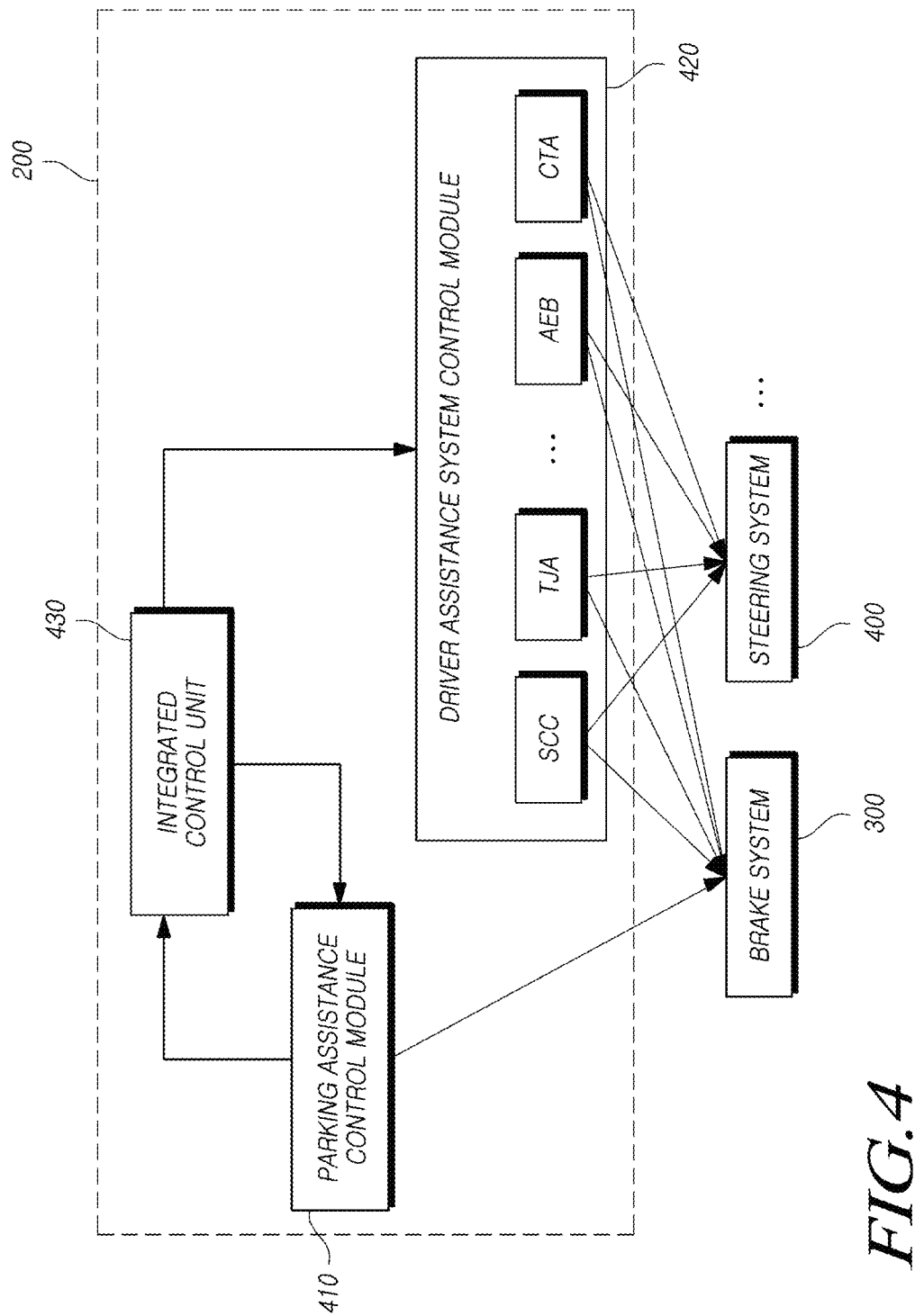
FIG. 4 is a diagram showing a configuration of an integrated control apparatus for driver assistance systems according to another embodiment.

FIG. 4 shows a configuration of an integrated control apparatus for driver assistance systems (DAS) (hereinafter referred to as an integrated control apparatus 200) according to exemplary embodiments.

Referring to FIG. 4, the integrated control apparatus 200 according to exemplary embodiments includes a parking assistance control module 410 configured to control automatic parking of a vehicle, a driver assistance system control module 420 configured to control one or more driver assistance systems (DAS) installed in the vehicle, and an integrated control unit 430 configured to control the parking assistance control module 410 and the driver assistance system control module 420.

When a parking assistance request signal is input from a driver, the parking assistance control module 410 receives the parking assistance request signal and controls steering and braking of the vehicle to perform automatic parking.

In detail, when the parking assistance request signal is received, the parking assistance control module 410 may search for a location designated for parking on the basis of information acquired through an ultrasonic sensor, a radar sensor, a camera sensor, and the like installed in the vehicle.

When the search is complete, the parking assistance control module 410 may set a location designated for parking, control steering and braking of the vehicle, and move the vehicle to the set location designated for parking to complete parking of the vehicle.

In this case, while automatic parking control is performed by the parking assistance control module 410, vehicle control (e.g., brake control, steering control, etc.) is performed by another driver assistance system (DAS), the automatic parking control cannot be completed by the parking assistance control module 410.

Also, a dangerous situation may occur when the parking assistance control module 410 operates in a space where automatic parking is not possible.

Accordingly, exemplary embodiments are characterized in that the operation of the parking assistance control module 410 and another driver assistance system (DAS) are controlled through the integrated control unit 430 so that smooth automatic parking control may be performed. In particular, brake operation of the other driver assistance system (DAS) may be controlled.

The driver assistance system control module 420 controls operation of the other driver assistance systems (DAS) installed in the vehicle.

The driver assistance system control module 420 may control operation of the driver assistance systems (DAS) other than the parking assistance control module 410 and may perform the control according to an activation command and a deactivation command output from the integrated control unit 430.

Here, the activation/deactivation command output from the integrated control unit 430 may be a command for turning on/off the operation of the driver assistance system control module 420 or a command for turning on/off some functions of the driver assistance system control module 420.

The integrated control unit 430 controls operation of the parking assistance control module 410 and operation of the driver assistance system control module 420 and restricts the brake operation performed by the other driver assistance system (DAS) while the automatic parking control is performed by the parking assistance control module 410.

When the parking assistance control module 410 receives a parking assistance request signal, the integrated control unit 430 receives the parking assistance request signal from the parking assistance control module 410.

Also, when the integrated control unit 430 receives the parking assistance request signal through the parking assistance control module 410, the integrated control unit 430 transmits a brake control signal deactivation command to the driver assistance system control module 420.

When the integrated control unit 430 transmits the brake control signal deactivation command to the driver assistance system control module 420, the integrated control unit 430 transmits an automatic vehicle control start command to the parking assistance control module 410 to allow the parking assistance control module 410 to start automatic parking control.

That is, the integrated control unit 430 may allow the parking assistance control module 410 to perform automatic parking control while the brake operation of the other driver assistance systems (DAS) is restricted, by transmitting a brake control signal deactivation command to the driver assistance system control module 420 before the parking assistance control module 410 starts automatic parking control.

Thus, it is possible to prevent the automatic parking control of the parking assistance control module 410 from being disrupted by the brake operation control of another driver assistance system (DAS) while the parking assistance control module 410 performs the automatic parking control.

Here, the driver assistance system control module 420 may deactivate generation of a brake control signal by another driver assistance system (DAS).

Alternatively, although a brake control signal is generated by another driver assistance system (DAS), the brake control signal may not be output while a brake control signal deactivation command is being received from the integrated control unit 430. Thus, it is also possible to prevent the brake operation control of the other driver assistance system (DAS) from being performed.

Also, the driver assistance system control module 420 may receive the driver assistance system deactivation command from the integrated control unit 430. In this case, the driver assistance systems (DAS) other than the parking assistance control module 410 are turned off.

When the driver assistance systems (DAS) are turned off, no brake control signals are output from the driver assistance systems (DAS) other than the parking assistance control module 410.

Accordingly, it is possible to prevent automatic parking control from being disrupted by a brake control signal or the like output from another driver assistance system (DAS) while the automatic parking control is being performed by the parking assistance control module 410.

When the automatic parking control is completed by the parking assistance control module 410 and a parking assistance completion signal is received from the parking assistance control module 410, the integrated control unit 430 transmits a brake control signal activation command to the driver assistance system control module 420.

Accordingly, the integrated control unit 430 may restrict the brake operation of the other driver assistance system (DAS) only while the automatic parking control is performed by the parking assistance control module 410. Thus, the automatic parking control may be safely performed, and the operation of the other driver assistance system (DAS) may be normally performed when the automatic parking control is complete.

Meanwhile, before the brake operation of the other driver assistance system (DAS) is restricted, the integrated control unit 430 may determine whether automatic parking is possible and may transmit a brake control signal deactivation command.

That is, in order to minimize restriction on the operation of the other driver assistance system (DAS) and prevent a dangerous situation caused by automatic parking control in a space where automatic parking is not possible, the integrated control unit 430 may determine validity of the automatic parking operation and may restrict automatic parking control and brake operation.

As an example, when a parking assistance request signal is received from the parking assistance control module 410, the integrated control unit 430 may compare the location of the vehicle with a destination set in a navigation device of the vehicle to determine whether to perform automatic parking control.

When the parking assistance request signal is received after the vehicle arrives at the destination set in the navigation device, the integrated control unit 430 may determine to perform the automatic parking control.

Alternatively, at a predetermined time after the vehicle arrives at the destination set in the navigation device, the integrated control unit 430 may determine to perform the automatic parking control on the vehicle.

When the integrated control unit 430 determines to perform the automatic parking control on the vehicle, the integrated control unit 430 transmits a brake control signal deactivation command to the driver assistance system control module 420 and transmits an automatic parking control start command to the parking assistance control module 410.

Also, when the vehicle does not arrive at the destination set in the navigation device, the integrated control unit 430 outputs a parking assistance control confirmation message so that a driver may perceive that the parking assistance request signal is wrong and withdraw the parking assistance request.

As another example, when a parking assistance request signal is received from the parking assistance control module 410, the integrated control unit 430 may determine whether the vehicle is located in a location designated for parking (e.g., a public parking lot) by using navigation information of the vehicle.

When it is determined that the vehicle is located in a parking lot, the integrated control unit 430 transmits a brake control signal deactivation command to the driver assistance system control module 420 and transmits an automatic parking control start command to the parking assistance control module 410 so that automatic parking control may be performed.

Also, when it is determined that the vehicle is located in a place not corresponding to a parking lot (e.g., on a road), the integrated control unit 430 outputs a parking assistance control confirmation message so that the driver may withdraw the parking assistance request.

As still another example, when the integrated control unit 430 receives a parking assistance request signal from the parking assistance control module 410, the integrated control unit 430 may determine whether parking is available in a space on the basis of information acquired through a sensor installed in the vehicle.

When a parking line or a parking sign is recognized by means of a camera sensor installed in the vehicle, the integrated control unit 430 may determine that parking is available in the space. When a road sign or the like is recognized, the integrated control unit 430 may determine that parking is not available in the space.

When it is determined that automatic parking is available, the integrated control unit 430 outputs a brake control signal deactivation command and an automatic parking control start command. When it is determined that automatic parking is not available, the integrated control unit 430 outputs a parking assistance control confirmation message. Thus, it is possible to safely perform the automatic parking control.

The determination of whether automatic parking is available may be performed by the parking assistance control module 410 as well as the integrated control unit 430.

As an example, when a parking assistance request signal is received, the parking assistance control module 410 may determine whether the automatic parking is possible on the basis of the navigation information of the vehicle or the information acquired by means of the sensor installed in the vehicle.

When it is determined that automatic parking is available, the parking assistance control module 410 transmits a parking assistance request signal to the integrated control unit

430. When automatic parking is not available, the parking assistance control module 410 outputs a parking assistance control confirmation message.

Thus, only when automatic parking is available, the parking assistance control module 410 may restrict the brake operation of the other driver assistance system (DAS) and safely perform the automatic parking.

Accordingly, according to exemplary embodiments, by restricting brake operation of a driver assistance system (DAS) other than the parking assistance control module 410 and then performing automatic parking control when a parking assistance request signal is received, it is possible to prevent the automatic parking control from being interrupted by operation of the other driver assistance system (DAS).

Also, by determining whether automatic parking is available in the space before restricting the automatic parking control of the parking assistance control module 410 and the brake operation of the other driver assistance system (DAS), it is possible to minimize unnecessary system restrictions and perform automatic parking control safely.

Figure 5:
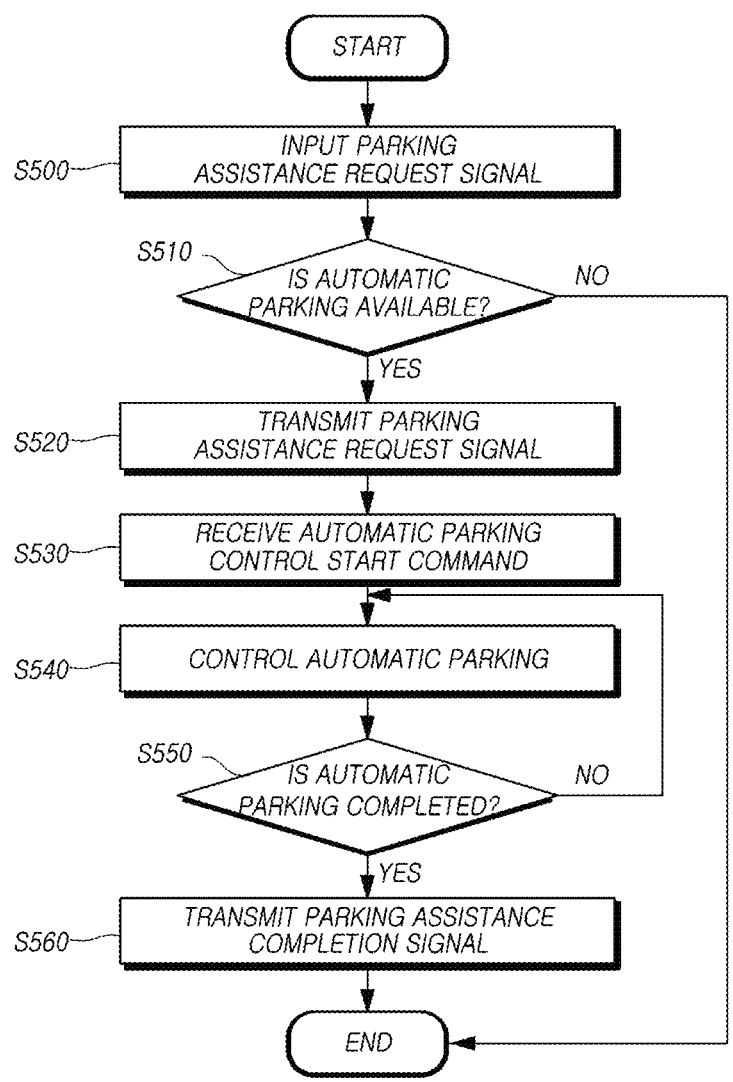
FIG. 5 is a diagram showing an example of an operating process for a parking assistance control module in the integrated control apparatus for driver assistance systems according to exemplary embodiments.

FIG. 5 shows an example of an operating process for the parking assistance control module 410 in the integrated control apparatus 200 according to exemplary embodiments.

Referring to FIG. 5, the parking assistance control module 410 receives a parking assistance request signal (S500). When the parking assistance request signal is received, the parking assistance control module 410 determines whether automatic parking is available in a space (S510).

Whether automatic parking is available in the space may be determined by the parking assistance control module 410 as well as the integrated control unit 430.

When it is determined that automatic parking is available in the space, the parking assistance control module 410 transmits a parking assistance request signal to the integrated control unit 430 (S520).

The parking assistance control module 410 receives an automatic parking control start command from the integrated control unit 430, which has transmitted a brake control signal deactivation command to the driver assistance system control module 420, (S530) and starts automatic parking control on the vehicle (S540).

The parking assistance control module 410 may control steering and braking of the vehicle, move the vehicle to a predetermined parking space, and perform the automatic parking control to complete parking of the vehicle.

When the automatic parking is complete (S550), the parking assistance control module 410 transmits a parking assistance completion signal to the integrated control unit 430 (S560) so that restriction on brake operation of the other driver assistance system (DAS) by means of the integrated control unit 430 may be withdrawn.

Figure 6:
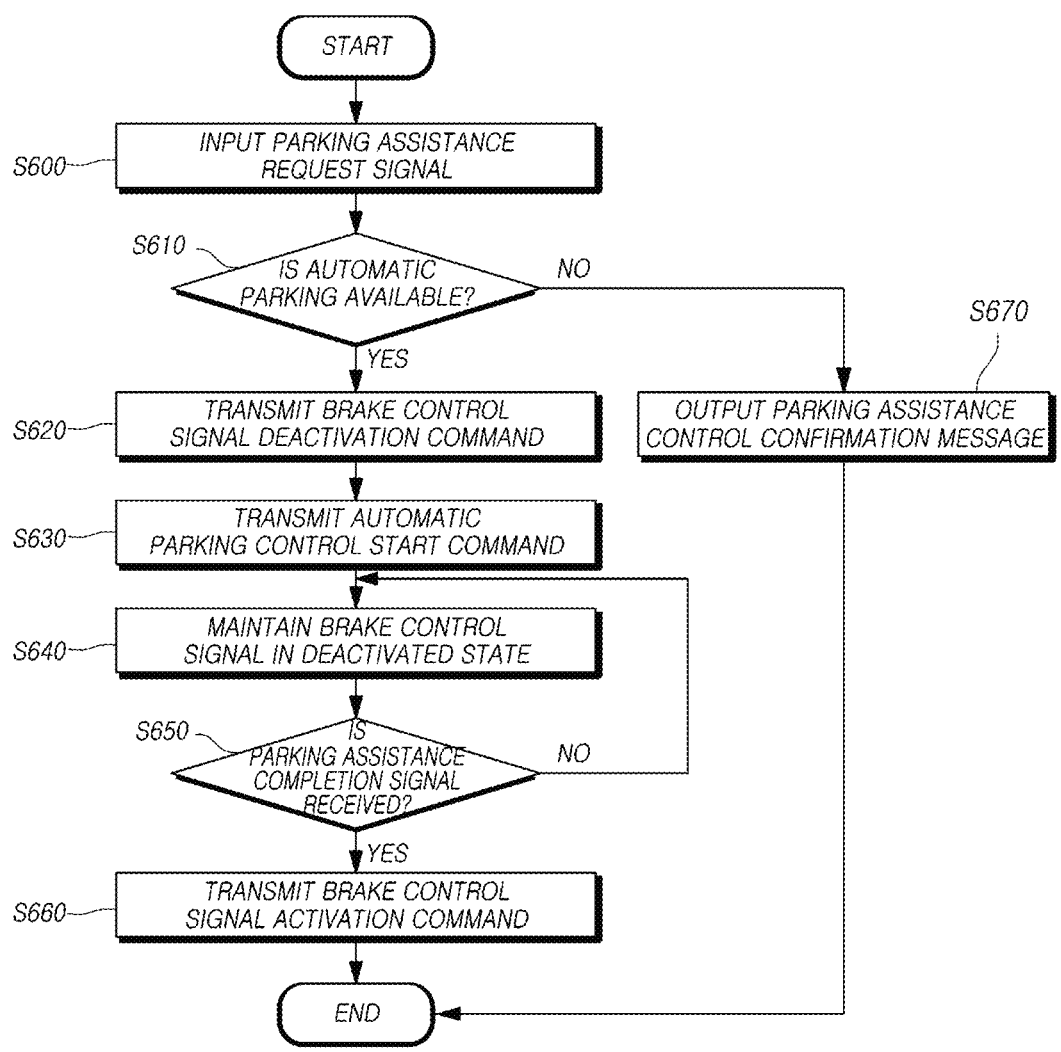
FIG. 6 is a diagram showing an example of an operating process for an integrated control unit in the integrated control apparatus for driver assistance systems according to exemplary embodiments.

FIG. 6 shows an example of an operating process for the integrated control unit 430 in the integrated control apparatus 200 according to exemplary embodiments.

Referring to FIG. 6, when a parking assistance request signal is received from the parking assistance control module 410 (S600), the integrated control unit 430 may determine whether automatic parking is available in a space (S610).

When it is determined that automatic parking is available in the space, the integrated control unit 430 transmits a brake control signal deactivation command to the driver assistance system control module 420 (S620) and transmits an automatic parking control start command to the parking assistance control module 410 (S630).

While the automatic parking control is being performed, the integrated control unit 430 maintains deactivation of a brake control signal of another driver assistance system (DAS) (S640). When a parking assistance completion signal is received from the parking assistance control module 410 (S650), the integrated control unit 430 transmits a brake control signal activation command to the driver assistance system control module 420 (S660).

When it is determined that automatic parking is not available in the space, the integrated control unit 430 outputs a parking assistance control confirmation message (S670) so that the parking assistance request may be withdrawn.

Figure 7:
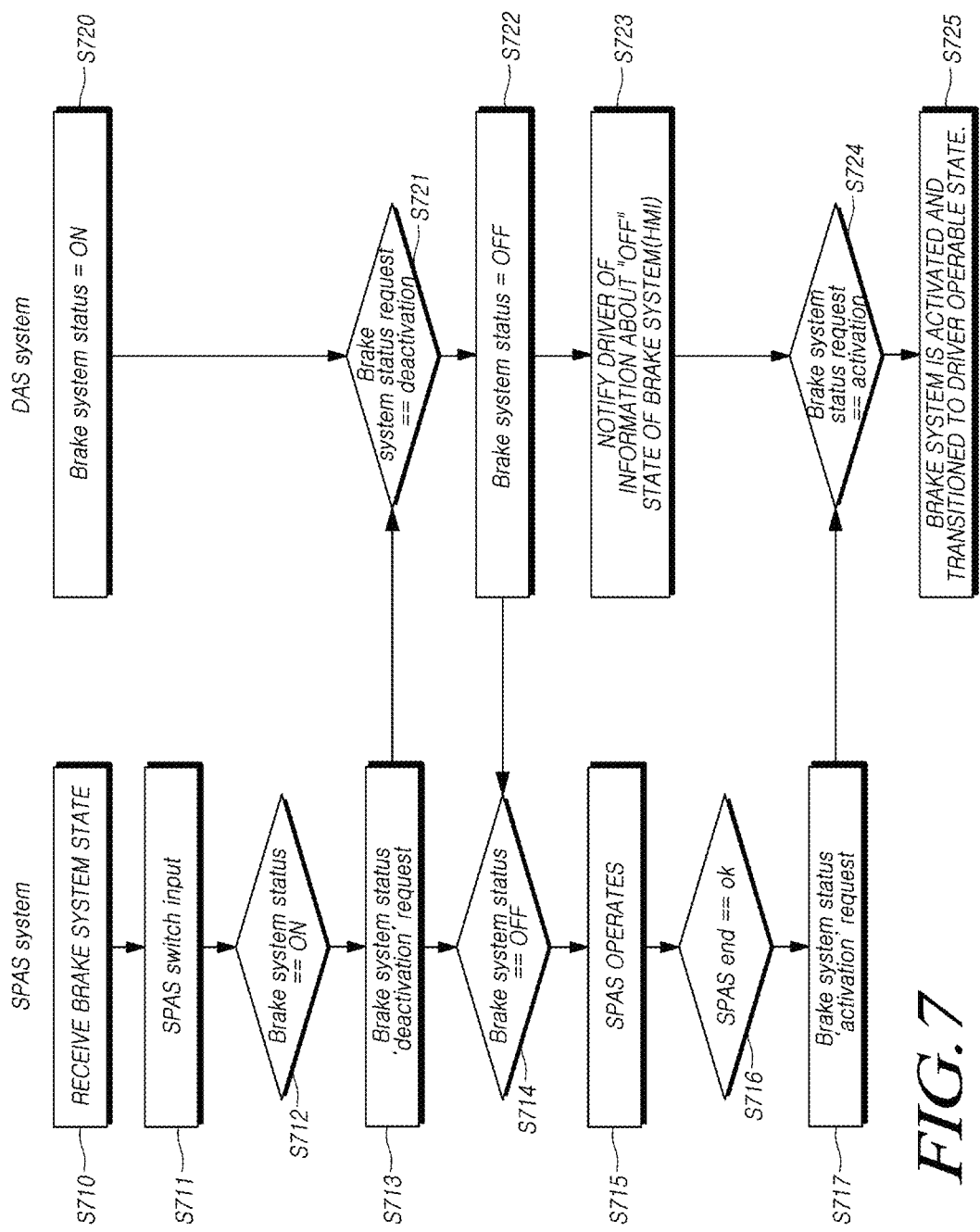
FIG. 7 is a diagram showing an example of an operating process for a parking assistance control module and a driver assistance system control module in the integrated control apparatus for driver assistance systems according to exemplary embodiments.

FIG. 7 shows, as an example of an interactive process between a smart parking assistance system (SPAS) corresponding to the parking assistance control module 410 and a driver assistance system (DAS) corresponding to the driver assistance system control module 420 in the integrated control apparatus 200 according to exemplary embodiments, a case in which another driver assistance system is controlled by the smart parking assistance system (SPAS).

That is, whether to perform automatic parking control or whether to restrict brake operation of the other driver assistance system (DAS) may be controlled by the integrated control unit 430 in the integrated control apparatus 200 according to exemplary embodiments. However, the brake operation of the other driver assistance system (DAS) may be restricted by the smart parking assistance system (SPAS), which is the parking assistance control module 410.

Referring to FIG. 7, the smart parking assistance system (SPAS) receives state information of a brake system from a driver assistance system (DAS) (S710).

When a parking assistance request signal is received through a switch or the like (S711), the smart parking assistance system (SPAS) checks a current state of brake operation of the driver assistance system (DAS) (S712).

When the current brake state of the driver assistance system (DAS) is an "on" state, the smart parking assistance system (SPAS) transmits a deactivation request to the driver assistance system (S713).

The driver assistance system (DAS) maintains the "on" state and controls brake operation of the driver assistance system (DAS) (S720). When the deactivation request is received from the smart parking assistance system (SPAS) (S721), the brake state of the driver assistance system (DAS) is changed to an "off" state (S722). Also, the driver assistance system (DAS) transmits information regarding the "off" state to the smart parking assistance system (SPAS).

The driver assistance system (DAS) may provide the information regarding the brake "off" state to a driver through a display or the like installed in the vehicle (S723).

When the brake "off" state of the driver assistance system is determined (S714), the smart parking assistance system (SPAS) starts automatic parking control (S715).

When the automatic parking control is completed due to parking completion or a driver's request withdrawal (S716), the smart parking assistance system (SPAS) transmits an activation request to the driver assistance system (DAS) (S717).

When the activation request is received from the smart parking assistance system (SPAS) (S714), the driver assistance system (DAS) changes the brake state of the driver assistance system (DAS) to an "on" state so that the brake operation of the driver assistance system (DAS) may be allowed (S725).

Therefore, according to exemplary embodiments, by performing the automatic parking control and the brake operation restriction by control of the integrated control unit 430 of the integrated control apparatus 200 or performing the brake operation restriction through communication between the smart parking assistance system (SPAS) and the driver assistance system (DAS), it is possible to prevent problems caused by simultaneous operation of several driver assistance systems (DAS) during the automatic parking control.

Figure 8:
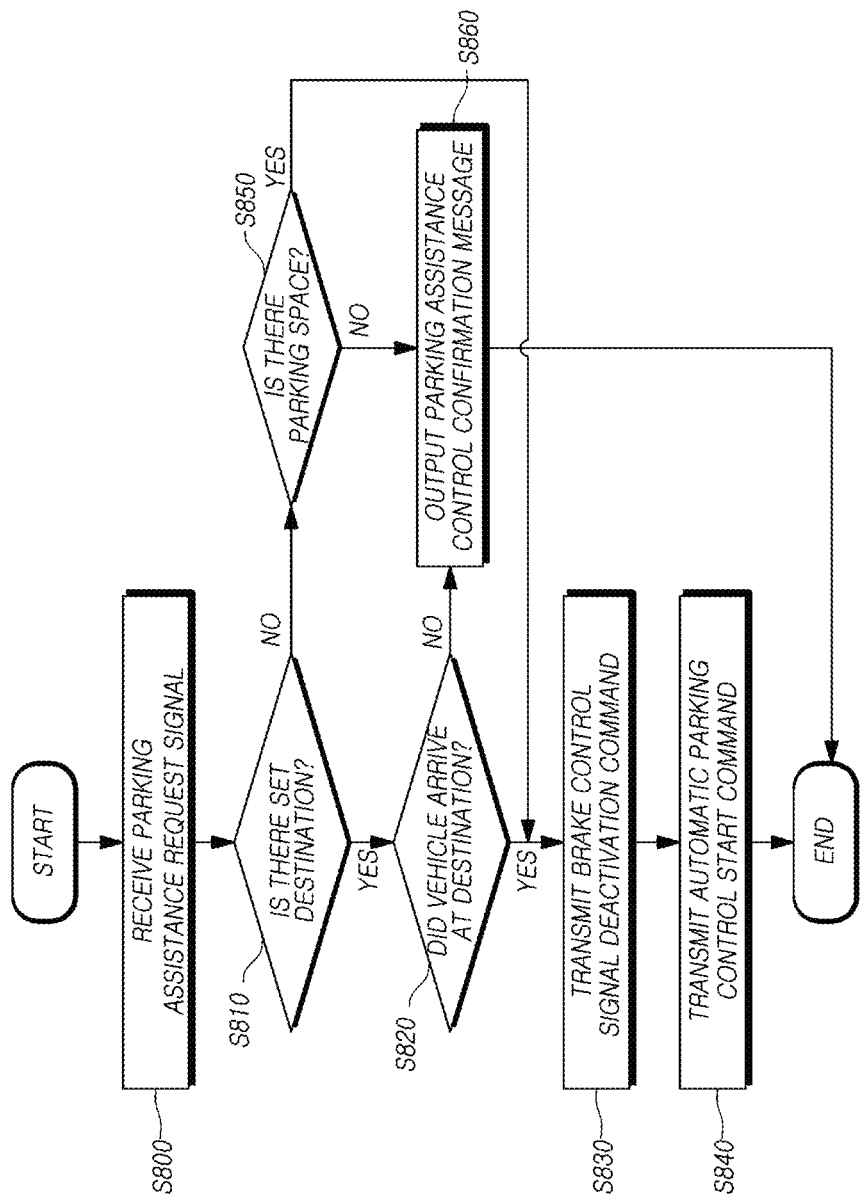
FIGS. 8 and 9 are diagrams showing an example of a process of determining validity of automatic parking in the integrated control apparatus for driver assistance systems according to exemplary embodiments.
Figure 9:
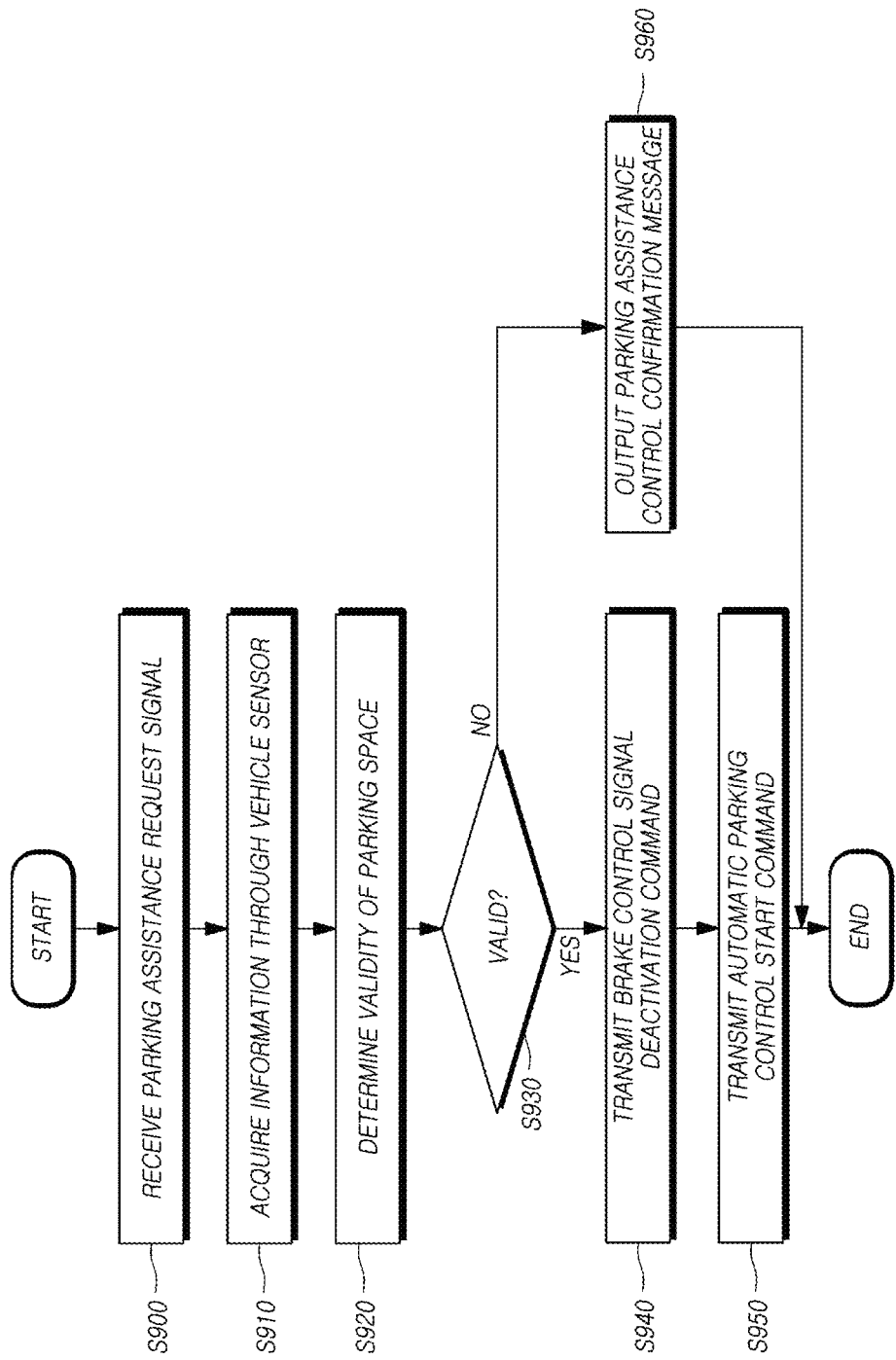

FIGS. 8 and 9 show an example of a process of determining availability of automatic parking control by means of the integrated control apparatus 200 according to exemplary embodiments before performing the automatic parking control and the brake operation restriction, and shows a case in which the determination is performed by the integrated control unit 430.

FIG. 8 shows a case in which the integrated control unit 430 determines availability of automatic parking by using a navigation device of the vehicle.

Referring to FIG. 8, when a parking assistance request signal is received from the parking assistance control module 410 (S800), the integrated control unit 430 may determine whether there is a destination set in the navigation device of the vehicle (S810).

When there is a destination set in the navigation device, the integrated control unit 430 determines whether the vehicle is in an arrived state at the destination (S820).

When it is determined that the vehicle is in an arrived state at the destination, the integrated control unit 430 transmits a brake control signal deactivation command to the driver assistance system control module 420 (S830) and transmits an automatic parking control start command to the parking assistance control module 410 (S840).

Also, when it is determined that the vehicle is not in an arrived state at the destination, the integrated control unit 430 may output a parking assistance control confirmation message (S860) so that the parking assistance request may be withdrawn.

When a destination is not set in the navigation device, the integrated control unit 430 determines whether the vehicle is located in a location designated for parking such as a parking lot by using information of the navigation device (S850).

When it is determined that the vehicle is located in a parking lot, the integrated control unit 430 may perform brake operation restriction of the other driver assistance system (DAS) and the automatic parking control of the parking assistance control module 410. When it is determined that the vehicle is located at a place other than a parking lot, the integrated control unit 430 outputs a parking assistance control confirmation message (S860).

FIG. 9 shows a case in which the integrated control unit 430 determines availability of automatic parking by using a sensor installed in the vehicle.

Referring to FIG. 9, when a parking assistance request signal is received from the parking assistance control module 410 (S900), the integrated control unit 430 may acquire information through a sensor such as a camera sensor installed in the vehicle (S910).

The integrated control unit 430 may identify a parking sign, a parking line, a road sign, or the like on the basis of information acquired through the sensor and determines whether parking is available in a space (S920 and S930).

When it is determined that automatic parking is available, the integrated control unit 430 transmits a brake control signal deactivation command to the driver assistance system control module 420 (S940) and transmits an automatic parking control start command to the parking assistance control module 410 (S950).

When it is determined that automatic parking is not available, the integrated control unit 430 outputs a parking assistance control confirmation message (S960) so that the parking assistance request may be withdrawn.

According to exemplary embodiments, by restricting brake operation of another driver assistance system (DAS) and performing automatic parking control when the parking assistance request signal is received, it is possible to prevent an occurrence of a dangerous situation caused by operation of the other driver assistance system (DAS) during the automatic parking control.

Also, by determining whether automatic parking is available before restricting the brake operation of the other driver assistance system (DAS) and starting the brake operation restriction and the automatic parking control, it is possible to minimize unnecessary system restrictions and perform automatic parking control safely.

Second embodiment: an embodiment in which the driver assistance system for controlling the engine system of the vehicle is included in the second driver assistance system control module.

In the second embodiment, for the sake of clarity, the first driver assistance system control module of FIGS. 1 to 3 is referred to as a parking assistance control module, and the second driver assistance system control module is referred to as a driver assistance system control module. Also, the second embodiment assumes that an integrated control module directly controls operation of an engine while controlling operation between driver assistance system control modules. That is, a case in which the integrated control module performs a function of receiving an engine control signal from the parking assistance control module and the driver assistance system control module and controlling the engine will be described.

Therefore, according to this embodiment, the integrated control module of FIGS. 1 to 3 is referred to as an engine control unit, and the engine control unit may configure the above-described integrated control module and an engine control module as separate modules or as a single module.

The more detailed embodiments will be described below, focusing on the second embodiment.

The embodiments provide an integrated control apparatus for driver assistance systems capable of preventing a dangerous situation caused by simultaneous operation of several driver assistance systems (DAS), by controlling the operation of the driver assistance systems (DAS) in a vehicle equipped with the driver assistance systems (DAS).

Figure 10:
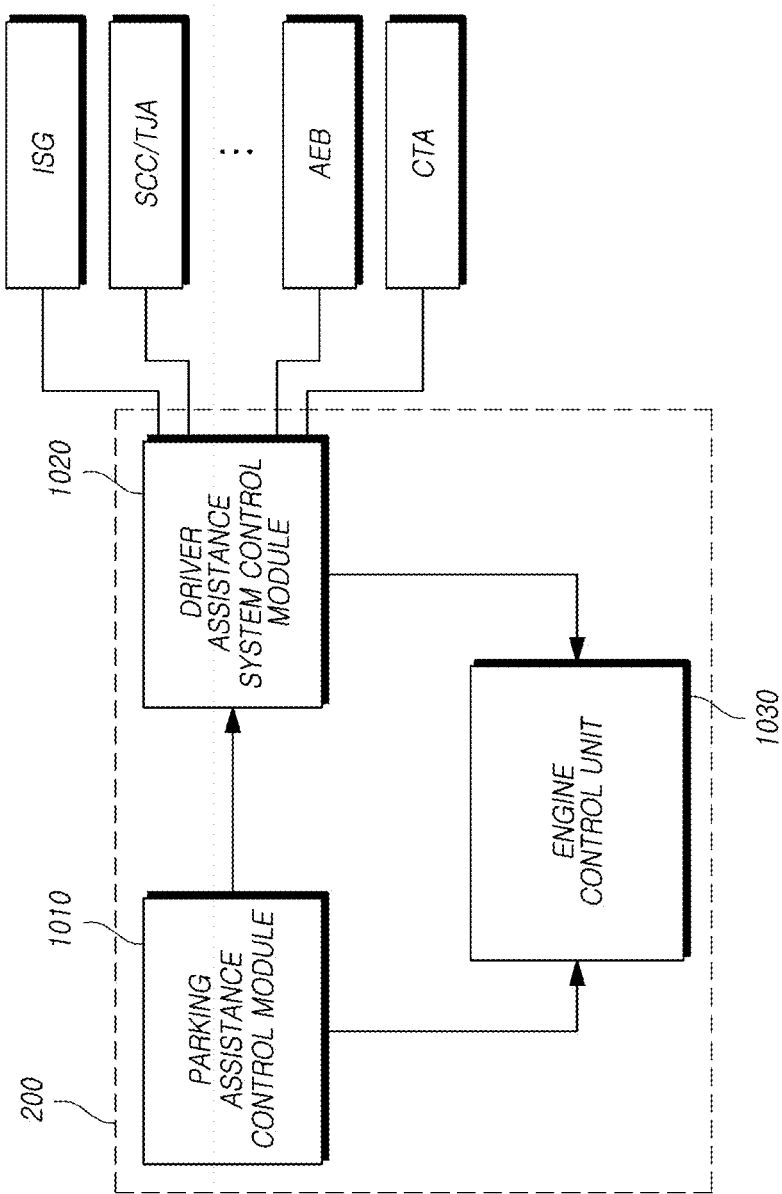
FIGS. 10 and 11 are diagrams showing an example of a configuration of the integrated control apparatus for driver assistance systems according to exemplary embodiments.
Figure 11:
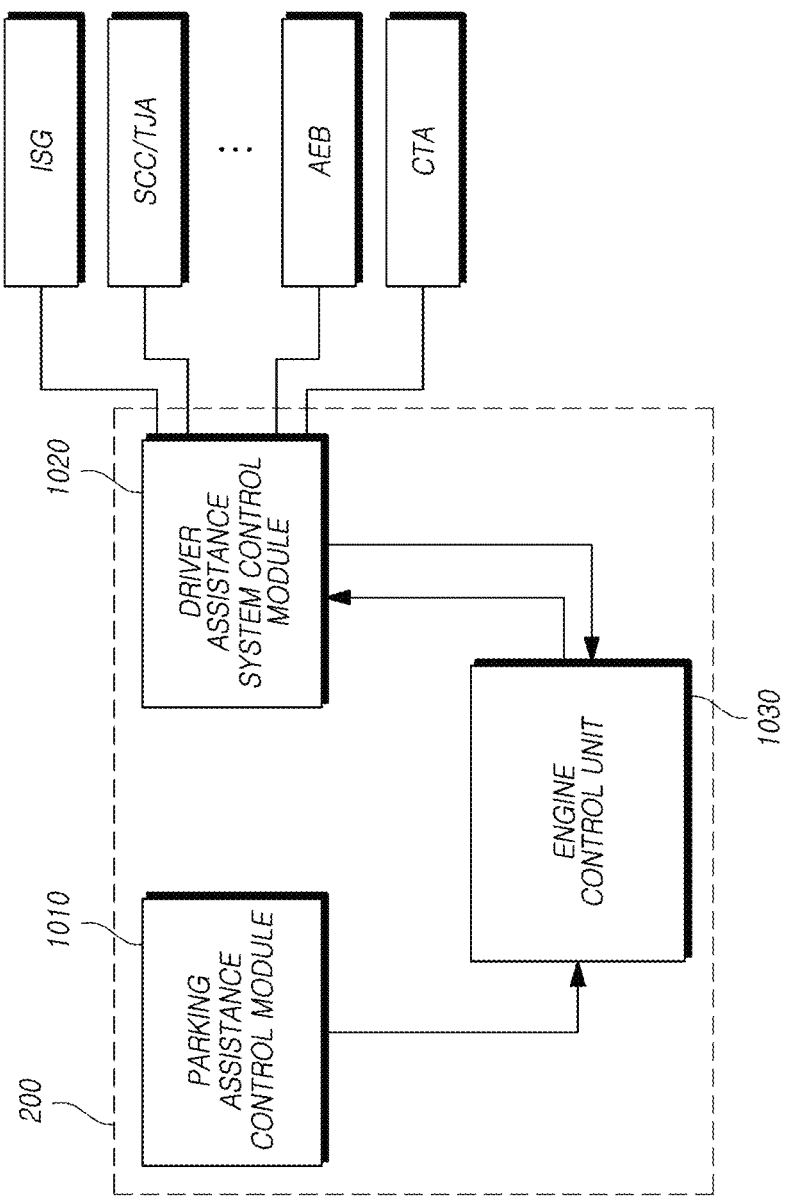

FIGS. 10 and 11 show a configuration of the integrated control apparatus for driver assistance systems according to exemplary embodiments.

Referring to FIG. 10, the integrated control apparatus 200 according to exemplary embodiments includes a parking assistance control module 1010 configured to control automatic parking of a vehicle, a driver assistance system control module 1020 configured to control another driver assistance system (DAS), and an engine control unit 1030 configured to control an engine of the vehicle according to an engine control signal output from the parking assistance control module 1010 or the driver assistance system control module 1020.

When a parking assistance request signal is received, the parking assistance control module 1010 may search for a parking space through an ultrasonic sensor, a radar sensor, a camera sensor, and the like installed in the vehicle and may set the parking space according to a result of the research.

Also, the parking assistance control module 1010 controls steering and braking of the vehicle, moves the vehicle to the set parking space, and performs automatic parking control on the vehicle.

The parking assistance control module 1010 outputs a first engine control signal to the engine control unit 1030 in order to perform engine control according to the automatic parking control while performing the automatic parking control on the vehicle.

Likewise, the driver assistance system control module 1020 outputs a second engine control signal to the engine control unit 1030 in order to perform engine control according to the operation of the other driver assistance system (DAS).

Here, the driver assistance system control module 1020 may output second engine control signals according to operation of several driver assistance systems (DAS) and may be present for each of the driver assistance systems (DAS).

When the driver assistance system control module 1020 outputs a second engine control signal according to operation of an Idle Stop and Go (ISG) system, the driver assistance system control module 1020 may output a second engine control signal for turning on or off the engine depending on a traveling state or a stopping state of the vehicle.

The engine control unit 1030 receives a first engine control signal output from the parking assistance control module 1010 or receives a second engine control signal output from the driver assistance system control module 1020.

Also, the engine control unit 1030 controls the engine of the vehicle according to the first engine control signal or the second engine control signal.

In this case, since the engine control unit 1030 controls the engine according to the engine control signals output from the parking assistance control module 1010 and the driver assistance system control module 1020, the vehicle control may not be smoothly performed by the driver assistance system (DAS) including the smart parking assistance system (SPAS).

Accordingly, when the first engine control signal is received from the parking assistance control module 1010, the engine control unit 1030 ignores the second engine control signal received from the driver assistance system control module 1020 and controls the engine of the vehicle according to the first engine control signal.

As an example, when a parking assistance start signal is received from the parking assistance control module 1010, the engine control unit 1030 controls the engine of the vehicle according to the first engine control signal received from the parking assistance control module 1010.

Also, until a parking assistance completion signal is received from the parking assistance control module 1010, the engine control unit 1030 ignores the second engine control signal received from the driver assistance system control module 1020 and controls the engine of the vehicle according to the first engine control signal.

Thus, while the automatic parking control of the vehicle is performed by the parking assistance control module 1010, the engine control unit 1030 may ignore engine control signals caused by operation of the other driver assistance systems (DAS) and may allow the engine of the vehicle to be controlled according to the first engine control signal from the parking assistance control module 1010.

Alternatively, when the first engine control signal is received from the parking assistance control module 1010 while the second engine control signal is received from the driver assistance system control module 1020, the engine control unit 1030 may ignore the second engine control signal and may control the engine of the vehicle according to the first engine control signal.

As an example, when the engine of the vehicle is turned off by the second engine control signal, the engine control unit 1030 needs to turn on the engine of the vehicle according to the first engine control signal and control the engine of the vehicle according to the automatic parking control.

Accordingly, when the first engine control signal is received from the parking assistance control module 1010 while the second engine control signal is received and the engine of the vehicle is turned off, the engine control unit 1030 may turn on and control the engine of the vehicle according to the first engine control signal.

In this case, when the first engine control signal is received, the engine control unit 1030 may determine whether automatic parking control requirements are satisfied. Only when automatic parking control requirements are satisfied, the engine control unit 1030 may ignore the second engine control signal and perform the engine control according to the first engine control signal.

Thus, the integrated control apparatus 200 according to exemplary embodiments may prevent the automatic parking control from being disrupted by the engine control signal of the other driver assistance system (DAS) that is generated while the automatic parking control is being performed and thus may enable the automatic parking control to be smoothly performed.

Also, when a parking assistance start signal is received from the parking assistance control module 1010 after the engine of the vehicle is turned off, the engine control unit 1030 turns on the engine and controls the engine according to the first engine control signal received from the parking assistance control module 1010.

That is, a parking assistance start signal may be received while the engine of the vehicle is turned off by operation of a driver assistance system (DAS) such as an ISG system. In this case, when the parking assistance start signal is received, the engine control unit 1030 turns on the engine of the vehicle and then controls the engine according to the first engine control signal of the parking assistance control module 1010.

Also, when the engine control unit 1030 receives the parking assistance start signal from the parking assistance control module 1010, the engine control unit 1030 may transmit an ISG system deactivation command to the driver assistance system control module 1020.

When the engine control unit 1030 receives the parking assistance start signal from the parking assistance control module 1010, the engine control unit 1030 may ignore the second engine control signal received from the driver assistance system control module 1020 or may transmit a deactivation command such as the ISG system deactivation command so that the second engine control signal cannot be received from the driver assistance system control module 1020.

Also, when the engine control unit 1030 receives a parking assistance completion signal from the parking assistance control module 1010, the engine control unit 1030 transmits the ISG system activation command to the driver assistance system control module 1020 so that the ISG system may operate normally.

The deactivation/activation command transmitted to the driver assistance system control module 1020 by the engine control unit 1030 may be applied to other driver assistance systems (DAS) such as a smart cruise control (SCC) system, as well as the ISG system.

In this case, the deactivation/activation command transmitted to the driver assistance system control module 1020 may be output by the engine control unit 1030 and also may be output by the parking assistance control module 1010.

FIG. 11 shows a case in which the deactivation/activation command transmitted to the driver assistance system control module 1020 by the integrated control apparatus 200 according to exemplary embodiments is output from the parking assistance control module 1010.

Referring to FIG. 11, when a parking assistance request signal is received, the parking assistance control module 1010 transmits the parking assistance request signal and a first engine control signal corresponding to automatic parking control to the engine control unit 1030.

Also, the parking assistance control module 1010 transmits an ISG system deactivation command to the driver assistance system control module 1020.

The driver assistance system control module 1020 deactivates an ISG system so that an engine control signal cannot be output by operation of the ISG system.

When the engine control unit 1030 receives a parking assistance start signal from the parking assistance control module 1010, the engine control unit 1030 ignores a second engine control signal received from the driver assistance system control module 1020 and controls the engine of the vehicle according to a first engine control signal received from the parking assistance control module 1010.

When the automatic parking control of the vehicle is completed, the parking assistance control module 1010 transmits the ISG system activation command to the driver assistance system control module 1020 and transmits a parking assistance completion signal to the engine control unit 1030.

The driver assistance system control module 1020 activates the ISG system according to the ISG system activation command received from the parking assistance control module 1010.

Also, the engine control unit 1030 controls the engine of the vehicle according to the second engine control signal received from the driver assistance system control module 1020.

Accordingly, while the automatic parking control is being performed by the parking assistance control module 1010, the engine control unit 1030 ignores the second engine control signal received from the driver assistance system control module 1020 and controls the engine of the vehicle according to the first engine control signal received from the parking assistance control module 1010.

Also, by deactivating the ISG system while the automatic parking control is being performed, the engine control unit 1030 prevents the engine from being turned off by operation of the ISG system.

When the parking assistance request signal is received, the integrated control apparatus 200 according to exemplary embodiments may determine availability of the automatic parking and perform the automatic parking control.

As an example, when the parking assistance request signal is received, the parking assistance control module 1010 determines whether there is a destination set in a navigation device of the vehicle. When there is a destination set in the navigation device, the parking assistance control module 1010 determines whether the vehicle is in an arrived state at the set destination. When the vehicle arrives at the set destination, the parking assistance control module 1010 transmits the parking assistance start signal and the first engine control signal to the engine control unit 1030.

As another example, when a parking assistance request signal is received from the parking assistance control module 1010, the parking assistance control module 1010 may determine whether the vehicle is located in a location designated for parking (e.g., a public parking lot) by using navigation information of the vehicle. When it is determined that the vehicle is located in a parking space, the parking assistance control module 1010 transmits the parking assistance start signal and the first engine control signal to the engine control unit 1030.

As still another example, when a parking assistance request signal is received from the parking assistance control module 1010, the parking assistance control module 1010 determines whether the vehicle is located in a space where the vehicle can be parked on the basis of a sensor or the like installed in the vehicle. When it is determined that the vehicle is located in the space where the vehicle can be parked, the parking assistance control module 1010 transmits the parking assistance start signal and the first engine control signal to the engine control unit 1030.

Accordingly, it is possible to prevent the second engine control signal of the driver assistance system control module 1020 from being unnecessarily ignored by the parking assistance control module 1010, by the parking assistance control module determining whether the automatic parking control is possible and transmitting the parking assistance start signal and the first engine control signal.

Also, when it is determined that the automatic parking is not available, the parking assistance control module 1010 outputs a parking assistance control confirmation message.

Accordingly, when the automatic parking is not available, the parking assistance control module 1010 allows the parking assistance request to be withdrawn so that the automatic parking control may be safely performed.

Figure 12:
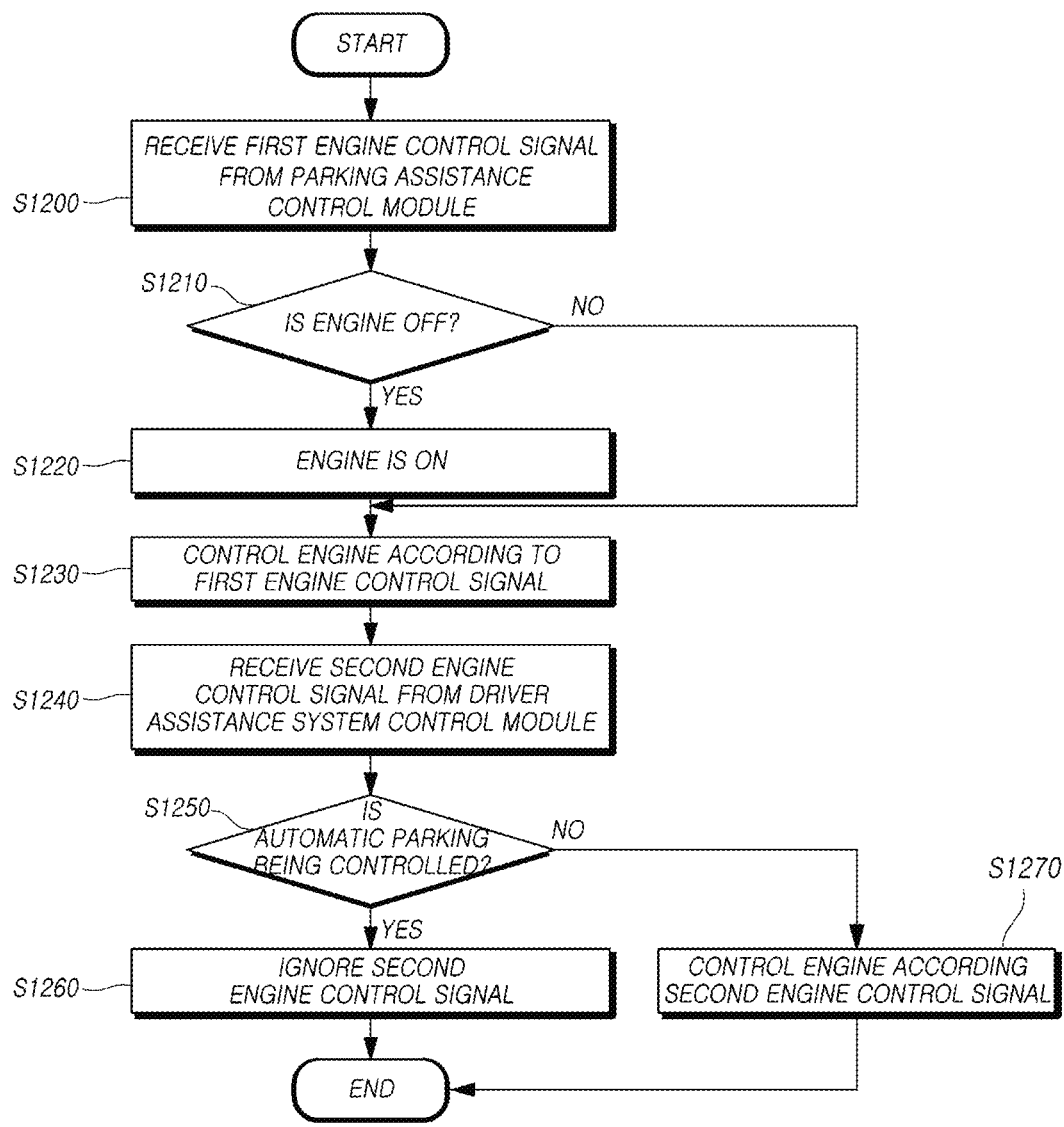
FIG. 12 is a diagram showing an example of an operating process for an engine control unit in the integrated control apparatus for driver assistance systems according to exemplary embodiments.

FIG. 12 shows an example of an operating process for the engine control unit 1030 in the integrated control apparatus 200 according to exemplary embodiments.

Referring to FIG. 12, the engine control unit 1030 receives a parking assistance start signal and a first engine control signal from the parking assistance control module 1010 (S1200).

When the engine of the vehicle is turned off by control of the ISG system or the like (S1210), the engine control unit 1030 turns on the engine (S1220)

Also, the engine control unit 1030 controls the engine of the vehicle according to the first engine control signal received from the parking assistance control module 1010.

When the engine control unit 1030 receives a second engine control signal from the driver assistance system control module 1020 (S1240), the engine control unit 1030 determines whether the automatic parking control is being performed by the parking assistance control module 1010 (S1250).

While the automatic parking control is being performed by the parking assistance control module 1010, the engine control unit 1030 ignores the second engine control signal (S1260). When the automatic parking control is completed, the engine control unit 1030 controls the engine of the vehicle according to the second engine control signal (S1270).

Accordingly, the engine control unit 1030 ignores an engine control signal of another driver assistance system (DAS) during the automatic parking control so that the engine cannot be controlled by the other driver assistance system (DAS) while the automatic parking control is being performed.

Furthermore, while the automatic parking control is being performed, the engine control unit 1030 deactivates the other driver assistance system (DAS) so that the engine control signal of the other driver assistance system (DAS) cannot be received.

Figure 13:
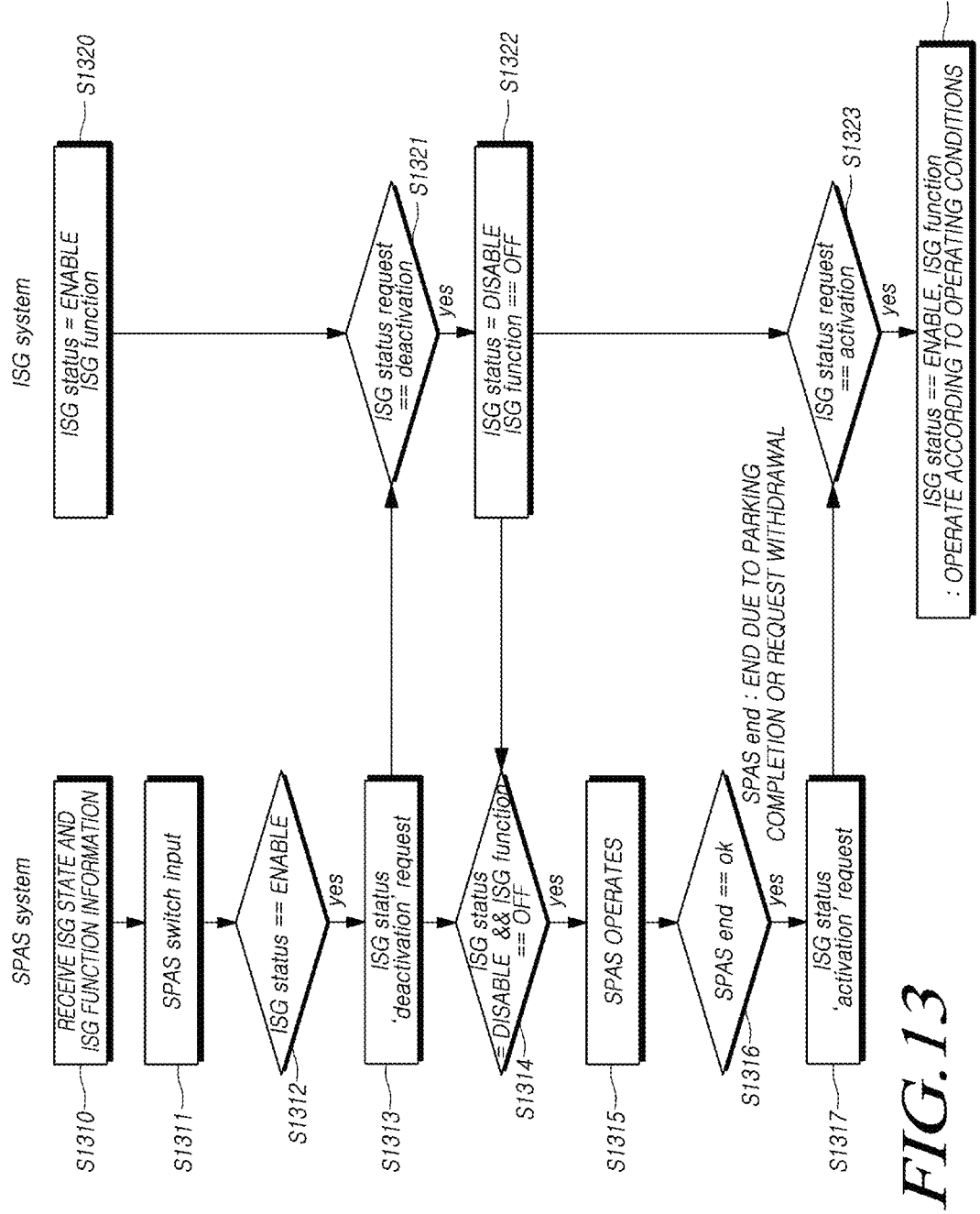
FIGS. 13 and 14 are diagrams showing an example of an operating process between a parking assistance control module and a driver assistance system control module in the integrated control apparatus for driver assistance systems according to exemplary embodiments.

FIG. 13 shows an example of an operating process between the parking assistance control module 1010 and a module for controlling the ISG system among the driver assistance system control modules 1020 in the integrated control apparatus 200 according to exemplary embodiments.

Referring to FIG. 13, the parking assistance control module 1010 receives information regarding states and functions of the ISG system (S1310).

When a parking assistance request is received by an input through a switch or the like (S1311), the parking assistance control module 1010 determines whether the state of the ISG system is activated (S1312).

When the state of the ISG system is activated, the parking assistance control module 1010 transmits a deactivation request to the ISG system (S1313).

When the state of the ISG system is activated and the function of the ISG system is turned on or off (S1320), the parking assistance control module 1010 receives a deactivation request from the parking assistance control module 1010 (S1321).

Here, the activation state of the ISG system is a state in which the function may be turned on or off, and the deactivation state of the ISG system is a state in which the function is not turned on and is maintained in an "off" state.

Also, while the function of the ISG system is turned on, the engine is turned off when the vehicle is stopped. While the function of the ISG system is turned off, the engine is not turned off although the vehicle is stopped.

When the ISG system receives a deactivation request from the parking assistance control module 1010, the state of the ISG system is deactivated, and the function of the ISG system is maintained in an "off" state (S1322).

When the state of the ISG system is deactivated and the function of the ISG system is turned off (S1314), the parking assistance control module 1010 starts the automatic parking control for the vehicle (S1315).

When the automatic parking control ends by completion or withdrawal of the automatic parking (S1316), the parking assistance control module 1010 transmits an activation request to the ISG system (S1317).

When the ISG system receives the activation request from the parking assistance control module 1010 (S1323), the state of the ISG system may be activated, and the function of the ISG system may be turned on or off (S1324).

Also, according to exemplary embodiments, by deactivating the ISG system while the automatic parking control is being performed, it is possible to prevent the engine from being turned off by operation of the ISG system during the automatic parking control.

The above-described method may be applied to other driver assistance systems (DAS) as well as the ISG system.

Figure 14:
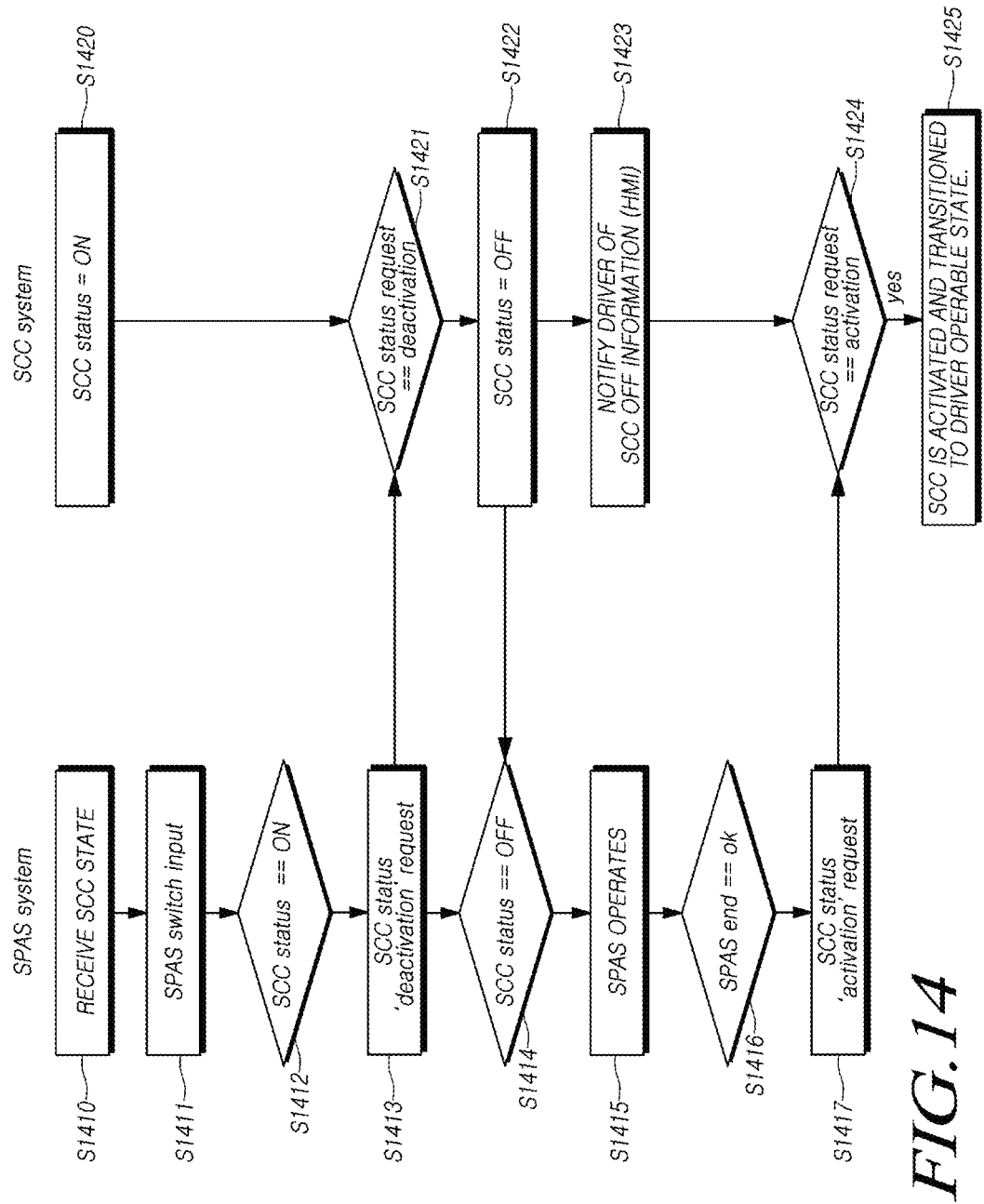

FIG. 14 shows an example of an operating process between the parking assistance control module 1010 and a module for controlling a smart cruise control (SCC) system among the driver assistance system control modules 1020 in the integrated control apparatus 200 according to exemplary embodiments.

Referring to FIG. 14, the parking assistance control module 1010 receives a state of the SCC system (S1410).

When the parking assistance control module 1010 receives a parking assistance request signal (S1411), the parking assistance control module 1010 determines the state of the SCC system (S1412).

When it is determined that the SCC system is in an "on" state, the parking assistance control module 1010 transmits a deactivation request to the SCC system (S1413).

When the SCC system receives the deactivation request from the parking assistance control module 1010 while the SCC system is in the "on" state (S1421), the SCC system is changed to an "off" state (S1422). Also, the SCC system may provide information regarding the "off" state to a driver through a display or the like in the vehicle (S1423).

When it is determined that the SCC system is in the "off" state (S1414), the parking assistance control module 1010 performs automatic parking control on the vehicle (S1415).

When the automatic parking control is completed (S1416), the parking assistance control module 1010 transmits an activation request to the SCC system (S1417).

When the SCC system receives the activation request (S1418), the SCC system is activated and changed to a state in which the SCC system is operable by the driver (S1425).

Accordingly, according to exemplary embodiments, it is possible to prevent a vehicle, which is being controlled for automatic parking, from following a preceding vehicle due to operation of the SCC system while the automatic parking control is being performed.

During the automatic parking control, the deactivation/activation command of the other driver assistance system (DAS) may be performed by the engine control unit 1030 of the integrated control apparatus 200 or the parking assistance control module 1010, as described above.

Meanwhile, the parking assistance control module 1010 may determine availability of the automatic parking and perform the automatic parking control so that an engine control signal of the other driver assistance system (DAS) cannot be unnecessarily ignored or deactivated.

Figure 15:
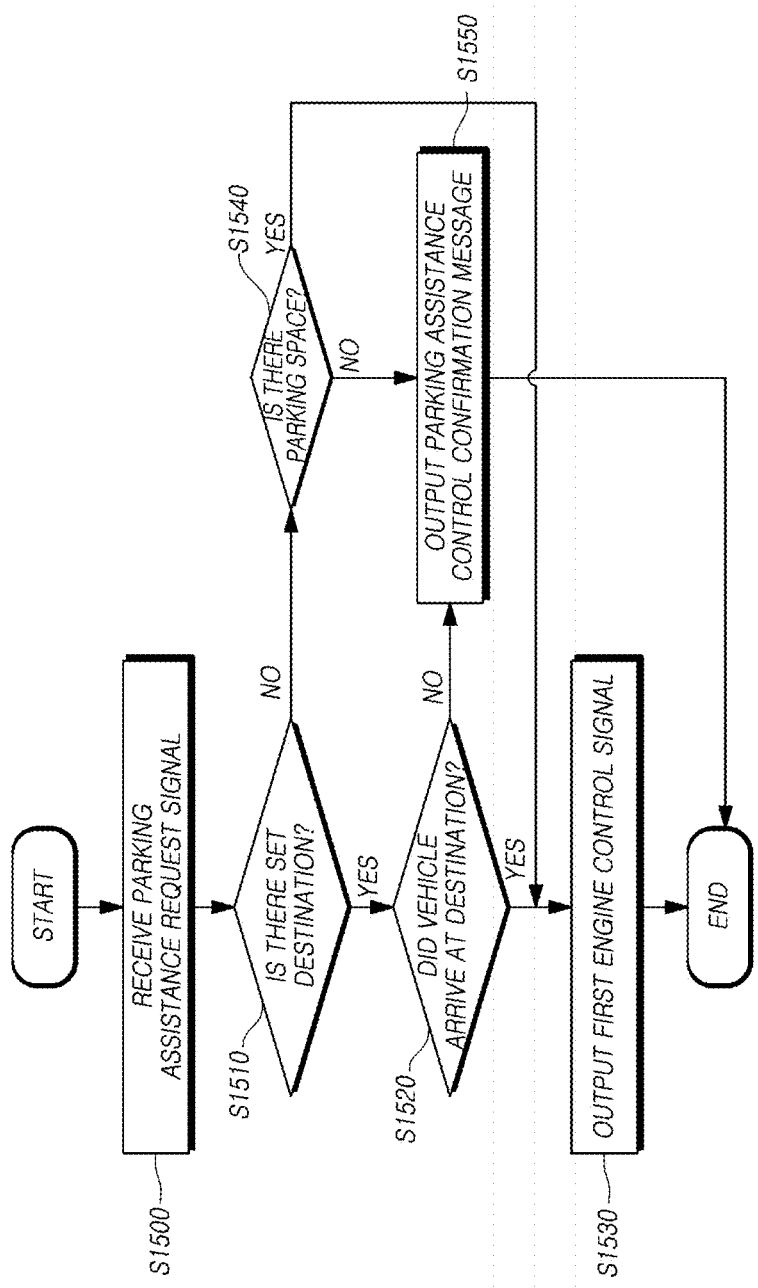
FIGS. 15 and 16 are diagrams showing an example of a process of determining validity of automatic parking in the integrated control apparatus for driver assistance systems according to exemplary embodiments.
Figure 16:
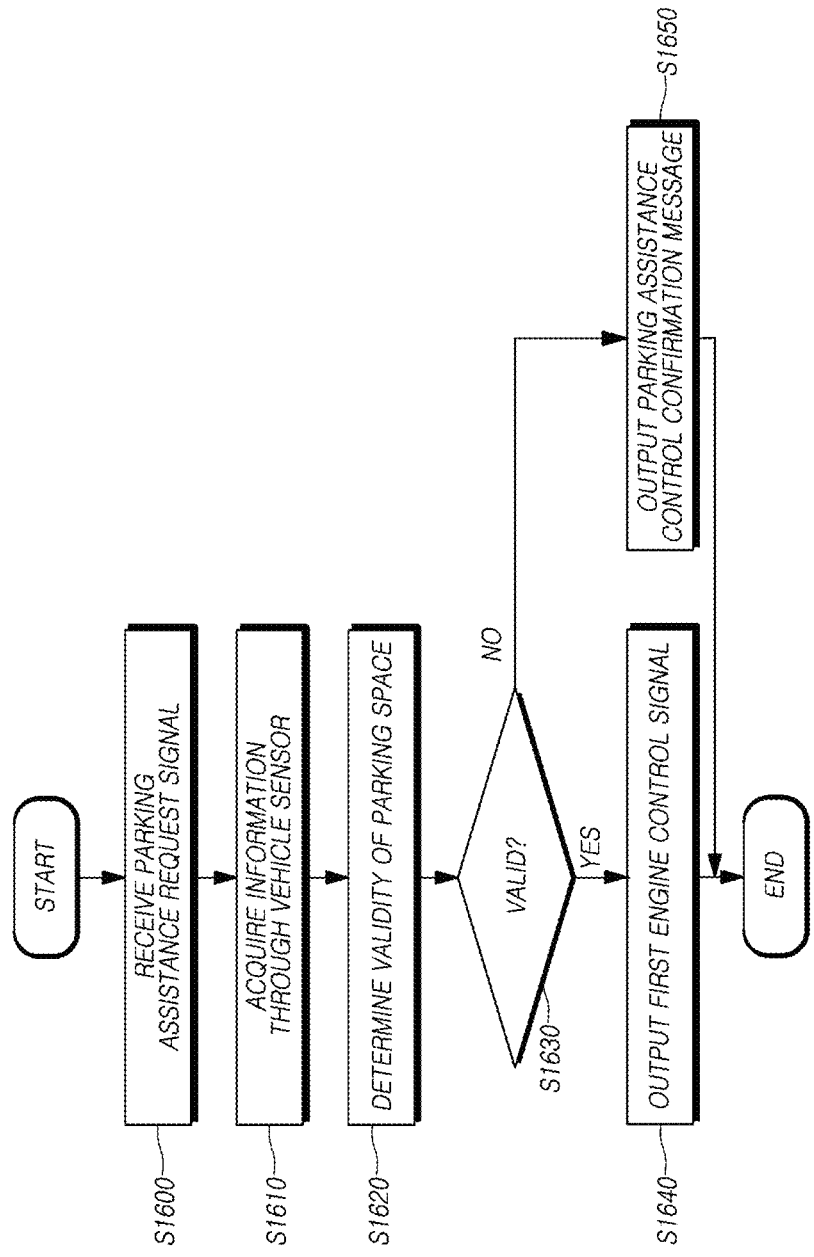

FIGS. 15 and 16 show an example in which the parking assistance control module 1010 determines the availability of the automatic parking in the integrated control apparatus 200 according to exemplary embodiments.

Referring to FIG. 15, the parking assistance control module 1010 receives a parking assistance request signal (S1500) and determines whether there is a destination set in a navigation device of the vehicle (S1510).

When there is a destination set in the navigation device, the parking assistance control module 1010 determines whether the vehicle is in an arrived state at the destination (S1520).

If the vehicle arrives at the destination, the parking assistance control module 1010 outputs a first engine control signal to the engine control unit 1030 so that the engine of the vehicle may be controlled according to the first engine control signal (S1530).

When there is not a destination set in the navigation device, the parking assistance control module 1010 determines whether the vehicle is located in a parking space by using navigation information (S1540).

While the vehicle is located in a parking space, the parking assistance control module 1010 outputs the first engine control signal to the engine control unit 1030 so that the engine of the vehicle may be controlled according to the first engine control signal (S1530).

When the vehicle is not in an arrived state at the set destination or when the vehicle is not located in a location designated for parking, the parking assistance control module 1010 outputs a parking assistance control confirmation message (S1550) so that a parking assistance request may be withdrawn and also so that the automatic parking control cannot be performed while the automatic parking is not possible.

Referring to FIG. 16, when the parking assistance control module 1010 receives a parking assistance request signal (S1600), the parking assistance control module 1010 acquires information through a sensor installed in the vehicle (S1610). The parking assistance control module 1010 determines whether automatic parking is available by using the acquired information.

When it is determined that the automatic parking is available (S1630), the parking assistance control module 1010 outputs a first engine control signal to the engine control unit 1030 (S1640). Also, when it is determined that the automatic parking is not available, the parking assistance control module 1010 outputs a parking assistance control confirmation message (S1650).

Accordingly, only when the automatic parking is available, the parking assistance control module 1010 transmits the parking assistance start signal and the first engine control signal to the engine control unit 1030 so that the engine control unit 1030 may ignore an engine control signal of another driver assistance system (DAS).

That is, by ignoring or deactivating the engine control signal of the other driver assistance system (DAS) only while the automatic parking control is available and performed, it is possible to prevent unnecessary restrictions.

Also, by allowing the parking assistance request to be withdrawn through the parking assistance control confirmation message when the automatic parking is not available, it is possible to safely perform the automatic parking control.

According to exemplary embodiments, while automatic parking control is being performed by a smart parking assistance system (SPAS) among driver assistance systems (DAS) installed in the vehicle, brake control of the other driver assistance systems (DAS) may be restricted. Thus, it is possible to prevent a dangerous situation caused by operation of the other driver assistance systems (DAS) during the automatic parking control.

Also, by determining whether automatic parking is available on the basis of information acquired through a sensor installed in a vehicle before restricting the brake control of the other driver assistance systems (DAS), it is possible to prevent unnecessary operation restrictions for the driver assistance systems (DAS) and allow the automatic parking control to be safely performed.

Also, by ignoring engine control signals of the other driver assistance systems (DAS) when an engine control signal is generated by the smart parking assistance system (SPAS), it is possible to prevent automatic parking control from being interrupted due to the operation of the other driver assistance systems (DAS) while the automatic parking control is being performed.

The above description is just for the purpose of illustratively describing the technical spirit of the present disclosure, and various modifications and changes may be made to the embodiments by those skilled in the art without departing from the essential characteristics of the present disclosure. Also, the embodiments disclosed herein are intended not to limit but to describe the technical spirit of the present disclosure, and the scope of the present disclosure is not limited to the embodiments. The scope of the present disclosure should be construed by the appended claims, and all technical ideas within the scope of their equivalents should be construed as being included in the technical spirit of the present disclosure.

What is claimed is:

1. An apparatus for integrated control of driver assistance systems, the apparatus comprising:

a first driver assistance system control module configured to control at least one driver assistance system installed in a vehicle;

a second driver assistance system control module configured to control a driver assistance system installed in the vehicle other than the driver assistance system controlled by the first driver assistance system control module; and an integrated control module configured to prevent the at least one driver assistance system controlled by the first driver assistance system control module and the driver assistance system other than the driver assistance system controlled by the first driver assistance system control module from operating at the same time, by:

receiving an operating state signal indicating an operating state of the at least one driver assistance system controlled by the first driver assistance system control module from the first driver assistance system control module, transmitting an activation control signal to the second driver assistance system control module causing activation of the driver assistance system controlled by the second driver assistance system control module when the operating state signal is received, transmitting, in direct response to an activation request signal from the first driver assistance system control module, a deactivation signal to the second driver assistance system control module, and transmitting, simultaneously with the transmission of the deactivation signal, an activation signal to the first driver assistance system control module, wherein an external database is not queried, and wherein an operating state of the second driver assistance system is not detected.

2. The apparatus of claim 1, wherein the integrated control module determines a control module for each driver assistance system installed in the vehicle as any one of the first driver assistance system control module and the second driver assistance system control module based on a predetermined criterion.

3. The apparatus of claim 2, wherein the predetermined criterion is set based on at least one of information regarding priorities that are set for the driver assistance systems, information regarding configurations of control targets of the vehicle that are controlled by the driver assistance systems, or information regarding conditions that are applied for the driver assistance systems.

4. The apparatus of claim 1, wherein the first driver assistance system control module controls a parking assistance control system configured to control parking of the vehicle, and wherein the second driver assistance system control module controls one or more driver assistance systems configured to control a brake control module installed in the vehicle other than the parking assistance control system.

5. The apparatus of claim 4, wherein when a parking assistance request signal of the parking assistance control system is included in the operating state signal, the integrated control module transmits an activation control signal instructing deactivation of the other driver assistance systems to the second driver assistance system control module, and wherein when the activation control signal is transmitted, the integrated control module transmits a parking assistance start command to the first driver assistance system control module.

6. The apparatus of claim 4, wherein when a parking assistance completion signal of the parking assistance control system is included in the operating state signal, the integrated control module transmits an activation control signal instructing activation of the other driver assistance systems to the second driver assistance system control module.

7. The apparatus of claim 1, wherein the first driver assistance system control module controls a parking assistance control system configured to control parking of the vehicle, and wherein the second driver assistance system control module controls one or more driver assistance systems configured to control an engine control module installed in the vehicle other than the parking assistance control system.

8. The apparatus of claim 7, wherein when a parking assistance request signal of the parking assistance control system is included in the operating state signal, the integrated control module transmits an activation control signal instructing deactivation of the other driver assistance systems to the second driver assistance system control module, and wherein when the activation control signal is transmitted, the integrated control module transmits a parking assistance start command to the first driver assistance system control module.

9. The apparatus of claim 7, wherein when a parking assistance completion signal of the parking assistance control system is included in the operating state signal, the integrated control module transmits an activation control signal instructing activation of the other driver assistance systems to the second driver assistance system control module.

10. The apparatus of claim 7, wherein when a parking assistance start signal of the parking assistance control system is included in the operating state signal, the integrated control module ignores operating state signals for the other driver assistance system received from the second driver assistance system control module.

* * * * *